United States Patent
Cui et al.

(10) Patent No.: US 11,019,157 B2
(45) Date of Patent: May 25, 2021

(54) CONNECTIONLESS SERVICE AND OTHER SERVICES FOR DEVICES USING MICROSERVICES IN 5G OR OTHER NEXT GENERATION COMMUNICATION SYSTEMS

(71) Applicants: AT&T INTELLECTUAL PROPERTY I, L.P., Atlanta, GA (US); AT&T Mobility II LLC, Atlanta, GA (US)

(72) Inventors: Zhi Cui, Sugar Hill, GA (US); Paul Smith, Jr., Heath, TX (US); Sangar Dowlatkhah, Plano, TX (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 72 days.

(21) Appl. No.: 16/294,648

(22) Filed: Mar. 6, 2019

(65) Prior Publication Data
US 2020/0287977 A1    Sep. 10, 2020

(51) Int. Cl.
H04L 29/08       (2006.01)
H04W 76/22      (2018.01)
(Continued)

(52) U.S. Cl.
CPC ............ H04L 67/16 (2013.01); H04W 4/50 (2018.02); H04W 76/22 (2018.02); H04W 4/08 (2013.01)

(58) Field of Classification Search
None
See application file for complete search history.

(56) References Cited

U.S. PATENT DOCUMENTS 5,913,160 A    6/1999 Leung
5,937,343 A    8/1999 Leung
(Continued)

FOREIGN PATENT DOCUMENTS

EP      2 988 542 A1    2/2016
WO    2013/184225 A1   12/2013

OTHER PUBLICATIONS

Non-Final Office Action received for U.S. Appl. No. 14/533,852 dated Nov. 2, 2016 29 pages.
(Continued)

*Primary Examiner* — Bunjob Jaroenchonwanit
(74) *Attorney, Agent, or Firm* — Amin, Turocy & Watson, LLP

(57) ABSTRACT

Techniques for instantiating and managing microservices for use in connection with devices associated with a core network are presented. A service management component (SMC) can determine a subgroup of services to be used for a group of one or more devices based on results of analysis of characteristics and service conditions associated with the group of devices, wherein a characteristic can relate to whether a device is stationary or mobile. At a desired time(s), which can be periodically, dynamically, or upon request, SMC can instantiate or facilitate instantiating the subgroup of services to facilitate communicating data associated with the device(s) using the subgroup of services. The services can comprise a connectionless service, connection-oriented service, charging service, authentication service, UPF services, or other services. SMC can employ the connectionless service when a device is stationary, but the connectionless service can be extended to devices when they are nomadic or mobile.

20 Claims, 11 Drawing Sheets

(51) Int. Cl.
*H04W 4/50* (2018.01)
*H04W 4/08* (2009.01)

(56) References Cited

U.S. PATENT DOCUMENTS

| | | | |
|---|---|---|---|
| 7,738,898 B2* | 6/2010 | Aaron | H04M 3/38 |
| | | | 455/519 |
| 8,509,169 B2 | 8/2013 | Van Der Merwe et al. | |
| 9,113,379 B2* | 8/2015 | Jung | H04W 36/0061 |
| 9,426,828 B1* | 8/2016 | Singh | H04W 72/082 |
| 9,755,842 B2* | 9/2017 | Raleigh | G06F 15/177 |
| 10,028,083 B2 | 7/2018 | Cui et al. | |
| 10,111,127 B2 | 10/2018 | Cui et al. | |
| 10,148,561 B2 | 12/2018 | Cui et al. | |
| 10,684,940 B1* | 6/2020 | Kayal | G06F 11/368 |
| 2003/0078042 A1* | 4/2003 | Miriyala | H04W 4/029 |
| | | | 455/435.1 |
| 2004/0203792 A1 | 10/2004 | Shaheen et al. | |
| 2005/0208938 A1 | 9/2005 | Pecen et al. | |
| 2007/0099649 A1 | 5/2007 | Han et al. | |
| 2008/0162637 A1 | 7/2008 | Adamczyk et al. | |
| 2009/0248841 A1 | 10/2009 | Tjandra et al. | |
| 2011/0028154 A1 | 2/2011 | Klatt et al. | |
| 2011/0103284 A1 | 5/2011 | Gundavelli et al. | |
| 2012/0002638 A1 | 1/2012 | Huh | |
| 2012/0079559 A1 | 3/2012 | Reznik et al. | |
| 2012/0195255 A1 | 8/2012 | Nylander et al. | |
| 2012/0195294 A1 | 8/2012 | Shah | |
| 2012/0196588 A1 | 8/2012 | Shah | |
| 2012/0258674 A1 | 10/2012 | Livet et al. | |
| 2013/0023274 A1 | 1/2013 | Meredith et al. | |
| 2013/0028163 A1 | 1/2013 | Hsiao et al. | |
| 2013/0150011 A1 | 6/2013 | Tofighbakhsh et al. | |
| 2014/0020102 A1 | 1/2014 | Srinivasan et al. | |
| 2014/0078988 A1 | 3/2014 | Kant et al. | |
| 2014/0112192 A1 | 4/2014 | Chou et al. | |
| 2014/0153572 A1 | 6/2014 | Hampel et al. | |
| 2014/0204746 A1 | 7/2014 | Sun et al. | |
| 2014/0204901 A1 | 7/2014 | Hedman et al. | |
| 2014/0226467 A1 | 8/2014 | Park | |
| 2015/0009826 A1 | 1/2015 | Ma et al. | |
| 2015/0063144 A1 | 3/2015 | Kozat | |
| 2015/0063166 A1 | 3/2015 | Sif et al. | |
| 2015/0230151 A1 | 8/2015 | Muhanna et al. | |
| 2016/0066310 A1 | 3/2016 | Hashimoto | |
| 2016/0073389 A1 | 3/2016 | Kishiyama et al. | |
| 2016/0088510 A1 | 3/2016 | Berggren et al. | |
| 2016/0127945 A1 | 5/2016 | Cui et al. | |
| 2016/0183315 A1 | 6/2016 | Worrell | |
| 2016/0198364 A1 | 7/2016 | Schwarzbauer et al. | |
| 2016/0242183 A1* | 8/2016 | Kang | H04W 72/1215 |
| 2016/0286544 A1 | 9/2016 | Ikeda et al. | |
| 2016/0337059 A1* | 11/2016 | Nehls | G06F 3/165 |
| 2016/0352637 A1 | 12/2016 | Wakumoto et al. | |
| 2016/0381594 A1 | 12/2016 | Tomici et al. | |
| 2017/0034757 A1 | 2/2017 | Yang et al. | |
| 2017/0063599 A1* | 3/2017 | Wu | H04L 41/5035 |
| 2017/0279910 A1 | 9/2017 | Maria | |
| 2017/0332421 A1* | 11/2017 | Sternberg | H04W 12/0609 |
| 2018/0014164 A1* | 1/2018 | Chen | H04W 8/18 |
| 2018/0176143 A1 | 6/2018 | Cui et al. | |
| 2018/0191563 A1 | 7/2018 | Farmanbar et al. | |
| 2018/0192471 A1 | 7/2018 | Li et al. | |
| 2018/0234318 A1 | 8/2018 | Cox et al. | |
| 2018/0270721 A1 | 9/2018 | Cui et al. | |
| 2018/0309625 A1* | 10/2018 | Adriazola | G05D 1/0094 |
| 2018/0316608 A1* | 11/2018 | Dowlatkhah | H04L 45/308 |
| 2019/0102157 A1* | 4/2019 | Caldato | G06F 11/203 |
| 2019/0208502 A1* | 7/2019 | Du | H04B 7/155 |
| 2019/0349954 A1* | 11/2019 | Quan | H04W 72/1242 |
| 2019/0373011 A1* | 12/2019 | Wardman | G06F 21/51 |
| 2019/0392137 A1* | 12/2019 | Beskrovny | G06F 21/554 |
| 2020/0112497 A1* | 4/2020 | Yenumulapalli | H04L 51/18 |
| 2020/0205122 A1* | 6/2020 | Liu | H04W 4/06 |

OTHER PUBLICATIONS

Final Office Action received for U.S. Appl. No. 14/533,852 dated May 4, 2017, 52 pages.
Non-Final Office Action received for U.S. Appl. No. 14/533,852 dated Nov. 15, 2017, 21 pages.
Notice of Allowance received for U.S. Appl. No. 14/533,852 dated Mar. 20, 2018, 23 pages.
Hampel et al., "Applying Software-Defined Networking to the Telecom Domain" IEEE Computer Communications Workshops, 2013, 6 pages.
Li et al., "Toward Software-Defined Cellular Networks," IEEE 2012 European Workshop on Software Defined Networking (EWSDN). 2012, 6 pages.
Pentikousis et al. "Mobileflow: Toward software-defined mobile networks," IEEE Communications Magazine 51.7, Jul. 2013, pp. 44-53.
Non-Final Office Action received for U.S. Appl. No. 14/533,747 dated Aug. 10, 2016, 29 pages.
Final Office Action received for U.S. Appl. No. 14/533,747 dated Apr. 19, 2017, 133 pages.
3GPP TS 23.002 V13.0.0 (Sep. 2014). 3rd Generation Partnership Project;Technical Specification Group Services and System Aspects; Network architecture (Release 13), 2014, 109 pages.
Non-Final Office Action received for U.S. Appl. No. 14/533,747 dated Oct. 3, 2017, 27 pages.
Final Office Action received for U.S. Appl. No. 14/533,747 dated Feb. 28, 2018, 29 pages.
Non-Final Office Action received for U.S. Appl. No. 14/533,747 dated Dec. 10, 2018, 52 pages.
Datapath.io. "What is Network Orchestration", Medium. Jun. 9, 2017. [https://medium.com/@datapath_io/what-is-network-orchestration-744cac97847c]. Retrieved on Apr. 8, 2020. 3 pages.
Final Office Action received for U.S. Appl. No. 14/533,747 dated Apr. 25, 2019, 20 pages.
Baliga et al. "VPMN—Virtual Private Mobile Network Towards Mobility-as-a-Service" MCS'11, Jun. 28, 2011, Bethesda, Maryland, 5 pages.
Banerjee et al. "MOCA: A Lightweight Mobile Cloud Offloading Architecture" Proceedings of the eighth ACM international workshop on Mobility in the evolving Internet architecture, Oct. 4, 2013, 6 pages.
Nunes et al "A Survey of Software-Defined Networking: Past Present and Future of Programmable Networks" IEEE Communications Surveys & Tutorials, vol. 16, No. 3, Third Quarter 2014, revised Oct. 28, 2013, 18 pages.
Suresh et al. "Towards Programmable Enterprise WLANs with Odin" HotSDN'12, Aug. 13, 2012, Helsinki, Finland, pp. 115-120.
Yazici et al. "Controlling a Software-Defined Network via Distributed Controllers" Proceedings of the 2012 NEM Summit, Istanbul, Turkey, Oct. 16-18, 2012, 6 pages.
Brown et al., "Service-Oriented 5G Core Networks", Heavy Reading, Feb. 2017, 10 pages.
Cisco "Evolving the Mobile Core to Being Cloud Native". White paper, 2017, 10 pages.

* cited by examiner

CONNECTIONLESS SERVICE AND OTHER SERVICES FOR DEVICES USING MICROSERVICES IN 5G OR OTHER NEXT GENERATION COMMUNICATION SYSTEMS

TECHNICAL FIELD

The subject disclosure relates generally to communications networks, and, for example, to connectionless service and other services for devices using microservices in Fifth Generation (5G) or other next generation communication systems.

BACKGROUND

Fifth Generation (5G) communication networks can have many diverse types of end points and services. 5G communication networks can utilize various different types of radio access network (RAN) technologies and various different types of devices that can have various different characteristics. A large number of devices, such as Internet of things (IoT) devices, are projected to connect to and communicate via 5G communication networks. Unique challenges exist to provide desirable levels of service to devices (e.g., IoT devices) associated with 5G, or other next generation, wireless communication networks.

The above-described description is merely intended to provide a contextual overview relating to communication networks, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
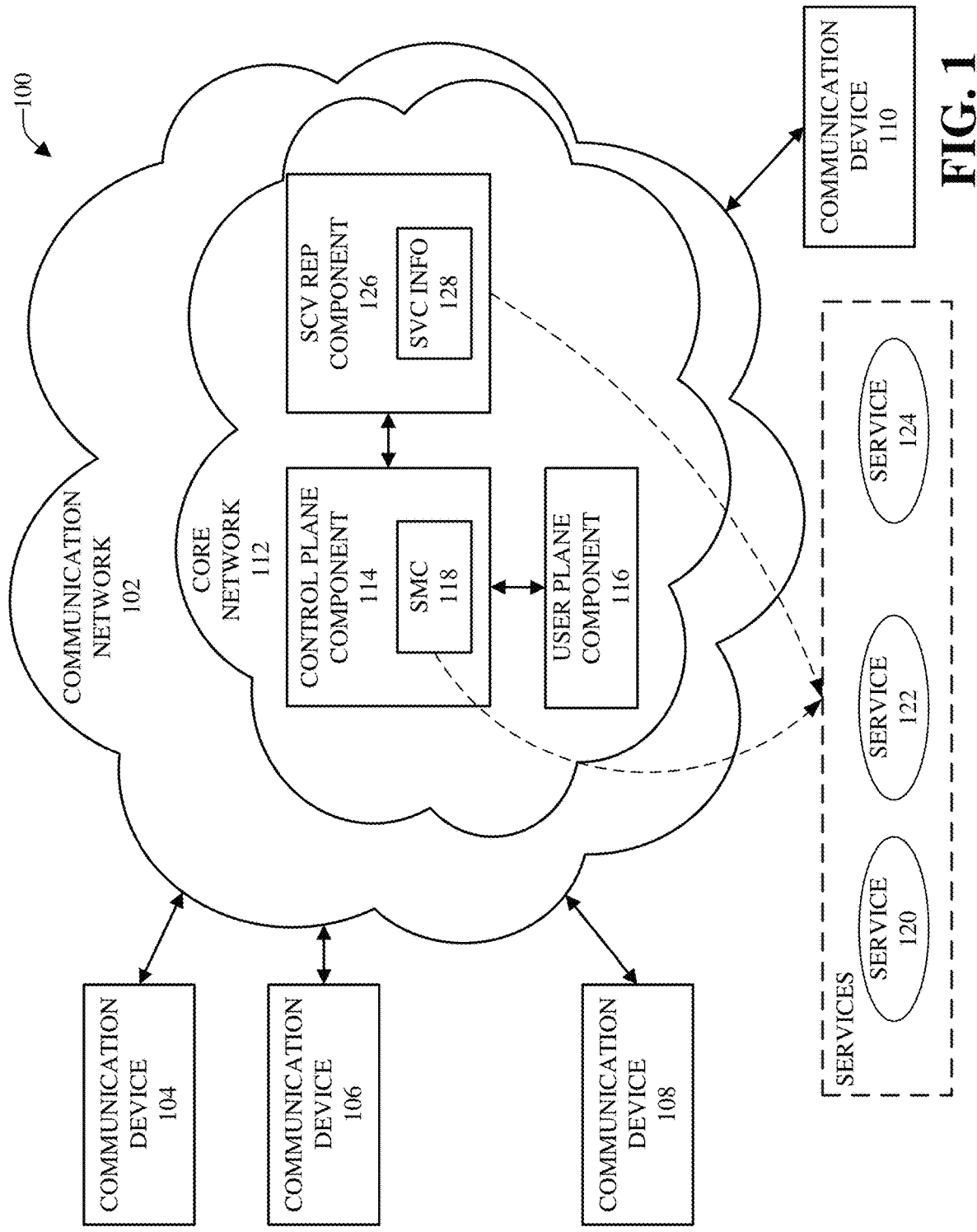
FIG. 1 depicts a block diagram of an example, non-limiting system that can instantiate and manage services (e.g., microservices) that can be provided or utilized for devices associated with a communication network (e.g., a core network), in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to instantiating and managing services (e.g., microservices) that can be provided or utilized for communication devices in 5G or other next generation networks. The disclosed subject matter can significantly improve data communications, data and device security, processing of data, and network efficiency associated with 5G or other next generation networks.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can multiple with a factor of $N_t$ over single antenna systems in a rich scattering environment.

5G communication networks can have many diverse types of end points and services. A large number (e.g., billions or tens of billions) of devices, such as Internet of things (IoT) devices, are projected to connect to and communicate via 5G communication networks. The traditional approach of cellular mobility management that treats all end points the same can be inefficient when there is a large number (e.g., billions or tens of billions) of end points (e.g., machine-to-machine (M2M) end points, such as end devices). 5G communication networks can employ various different types of radio access network (RAN) technologies and various different types of devices that can have various different characteristics (e.g., device characteristics). It can be desirable to have different network services and capabilities that can be tailored to the variety of different service specifications of the different devices.

These and other unique challenges can exist with regard to providing desired levels of service to devices (e.g., IoT devices) associated with 5G, or other next generation, wireless communication networks.

To that end, the disclosed subject matter presents techniques, methods, and systems that can efficiently instantiate and manage services that can be provided to communication devices associated with a communication network (e.g., a core network). The disclosed subject matter can provide an intelligent and flexible service oriented 5G (or other next generation) mobility architecture using certain services (e.g., microservices). Such architecture can dynamically create a business/service domain based at least in part on the types of end devices and the service specifications of the end devices and/or an entity associated with the end devices.

The disclosed subject matter can employ a service-oriented architecture (SOA) design that can be structured to break up a business domain into reusable services, and assemble different services together to create applications. For instance, the disclosed subject matter can configure or decompose mobility network functions (e.g., 5G mobility network functions) to create independent and reusable services (e.g., microservices), and can create and utilize other services, such as connectionless services, and a related set of functions to enable efficient support and the provision of services to communication devices, including stationary communication devices (e.g., devices that can be fixed or stationary in a location) and/or nomadic (e.g., moving or readily movable) communication devices.

Within the SOA architecture design, microservice can be a specific way to implement a service. Microservices can be container-based service implementations deployed and managed by an unshared container, wherein, for example, containers can manage the infrastructure and dependencies and handles all of the input/output (I/O), monitoring, and security overhead (environment), while the application can be free to execute business processes. Each microservice instance can run in its own container.

The disclosed subject matter can comprise a service management component that can instantiate and manage services that can be provided to communication devices associated with the communication network (e.g., core network), in accordance with various aspects and embodiments of the disclosed subject matter. In accordance with various embodiments, the service management component can comprise or be associated with an open networking automation platform (ONAP) component and/or a software-defined network (SDN) controller, which can be utilized to facilitate instantiating and managing the services. The service management component can analyze characteristics of a group of communication devices (e.g., a group comprising one or more communication devices) to which services are to be provided and service specifications (e.g., service conditions) associated with the communication devices and/or an entity (e.g., a utility provider, a service provider, or a user). Based at least in part on the results of the analysis of the device characteristics and the service specifications, the service management component can determine and select a subset of services that are to be grouped together (e.g., utilized, employed, or assembled together) to create (e.g., dynamically create) an application(s) (e.g., via one or more application programming interfaces (APIs)) that can utilize the subset of services and/or provide the subset of services to the group of communication devices to facilitate desirable and efficient data communications between the group of communication devices and another communication device(s) via the communication network.

At a desired time(s) (e.g., periodically, dynamically, or upon request), the service management component can create (e.g., dynamically create) an application for the group of communication devices, wherein the application can comprise or be associated with the subset of services determined for the group of communication devices based at least in part on the results of analyzing the characteristics and service conditions associated with the group of communication devices. The service management component can instantiate or facilitate instantiating the subset of services, and can manage the subset of services to facilitate desirable communication of data between the group of communication devices and another communication device(s) associated with the communication network.

In some embodiments, the disclosed subject matter can comprise a service repository component that can be associated with the service management component. The services (e.g., microservices) can be registered with the service repository component. The service repository component can store respective service-related information regarding the respective services. The service management component can access the service repository component to access the service-related information, wherein the service management component can utilize the service-related information to facilitate determining which services to select for a group of communication devices, and instantiating and managing such services.

These and other aspects and embodiments of the disclosed subject matter will now be described with respect to the drawings.

FIG. 1 depicts a block diagram of an example, non-limiting system 100 that can instantiate and manage services (e.g., microservices) that can be provided or utilized for devices associated with a communication network (e.g., a core network), in accordance with various aspects and embodiments of the disclosed subject matter. The system 100 can comprise a communication network 102 that can facilitate (e.g., enable) communications between communication devices (e.g., user equipment (UE)), including communication devices 104, 106, 108, and/or 110, associated with (e.g., communicatively connected to) the communication network 102. The communication network 102 can comprise various components, such as network (NW) node devices (e.g., radio network node devices) that can be part of the communication network 102 to facilitate communication of information between devices (e.g., communication devices 104, 106, 108, and/or 110) that can be associated with (e.g., communicatively connected to) the communication network 102. In some embodiments, the communication network 102 can employ MIMO technology to facilitate data communications between devices (e.g., network node devices, communication devices, . . . ) in the communication network 102.

As used herein, the terms "network node device," "network node," and "network device" can be interchangeable with (or include) a network, a network controller or any number of other network components. Further, as utilized herein, the non-limiting term radio network node, or network node (e.g., network device, network node device) can be used herein to refer to any type of network node serving communications devices (e.g., 104, 106, . . . ) and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices also can comprise multiple antennas for performing various transmission operations (e.g., MIMO operations). A network node can comprise a cabinet and other protected enclosures, an antenna mast, and actual antennas. Network devices can serve several cells, also called sectors, depending on the configuration and type of antenna. Network node devices can be, for example, Node B devices, base station (BS) devices, access point (AP) devices, TRPs, and radio access network (RAN) devices. Other examples of network node devices can include multi-standard radio (MSR) node devices, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

A communication device (e.g., 104, 106, or 108, . . . ) also can be referred to as, for example, a device, a mobile device, or a mobile communication device. The term "mobile device" can be interchangeable with (or include) a UE or other terminology. A communication device (or UE, device, . . . ) can refer to any type of wireless device that can communicate with a radio network node in a cellular or mobile communication system. Examples of mobile devices can include, but are not limited to, a target device, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a smart meter (e.g., a smart utility meter), devices and/or sensors that can monitor or sense conditions (e.g., health-related devices or sensors, such as heart monitors, blood pressure monitors, blood sugar monitors, health emergency detection and/or notification devices, . . . ), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic eyeglasses, headwear, or bodywear having wireless communication functionality), a device associated or integrated with a vehicle, a home or building automation device (e.g., security device, climate control device, lighting control device, . . . ), an industrial or manufacturing related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the mobile device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech is simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

The communication network 102 can comprise a set of cells (not shown in FIG. 1) wherein respective cells can be associated with respective base stations. For example, a radio access network (RAN) (not shown in FIG. 1) can comprise or be associated with a set of base stations that can serve communication devices (e.g., 104, 106, or 108, . . . ) located in respective coverage areas served by respective base stations in the communication network 102. In some embodiments, the RAN can be a cloud-RAN (C-RAN) that can be located in or associated with a cloud computing environment, comprising various cloud network components of the communication network 102. The respective cells of the set of cells can have respective coverage areas that can form the coverage area covered by one or more sectors of the communication network 102. The respective communication devices (e.g., 104, 106, or 108, . . . ) can be communicatively connected to the communication network 102 via respective wireless communication connections with one or more of the respective cells. For example, communication device 104 can be connected to the communication network 102 via a first cell, and communication device 106 can be connected to the communication network 102 via a second cell.

The communication network 102 can comprise or be associated with a core network 112 that can provide communication services, including wireless communication services, to communication devices (e.g., 104, 106, and/or 108, . . . ) associated with the core network 112. In some embodiments, the core network 112 can be or can comprise a 5G or other next generation core network.

The core network 112 can comprise a control plane component 114 and a user plane component 116, wherein the control plane component 114 can be associated with (e.g., communicatively connected to) the user plane component 116. The control plane component 114 can comprise control plane functions or components, and the user plane component 116 can comprise user plane functions or components, wherein the control plane functions or components can be employed to facilitate controlling the user plane functions or components, and/or the communication or routing of data, as more fully described herein.

The core network 112 can comprise or be associated with a service management component 118 that can manage the providing of services (e.g., microservices and/or other services) to communication devices (e.g., 104, 106, 108, and/or 110, . . . ) and associated entities (e.g., users and/or businesses). In accordance with various embodiments, the service management component 118 can be part of the control plane component 114 (as depicted in FIG. 1), can be situated outside of the control plane component 114 in the core network 112, or can be a separate or stand-alone component from the core network 112, or a combination thereof (e.g., the service management component 118 can comprise subcomponents that respectively can be situated within or outside of the control plane component 114 or core network 112).

The services can comprise, for example, service 120, service 122, and/or service 124. In some embodiments, all or a desired portion of the services (e.g., 120, 122, and/or 124, . . . ) can be microservices that can be independently reusable and can be derived by decomposing mobility network functions of the core network 112 to form (e.g., create or produce) the microservices. The services (e.g., 120, 122, and/or 124, . . . ) can comprise or relate to, for example, a connectionless service, a connection-oriented service, a charging service, an authentication service, a data cryptography service (e.g., data encryption or decryption service), data coding service (e.g., data encoding or decoding service, with error correction), UPF services, and/or a slice service.

The connectionless service can facilitate data communications by the core network 112 without having to establish a mobility communication tunnel associated with a core network device(s) of the core network 112, as more fully described herein. The connection-oriented service can facilitate data communications by establishing a mobility communication tunnel associated with a core network device(s) of the core network 112. The charging service can perform and/or provide mobility-based charging, location-based charging, subscription-related charging, other communication-related charging, and/or other types of service charging in connection with data communications, applications, or other services associated with a communication device(s) (e.g., 104, 106, 108, and/or 110, . . . ). The authentication service (e.g., optimized authentication service) can employ authentication and a desired authentication protocol to secure data being communicated between communication devices (e.g., between wireless communication device (e.g., 104) and another communication device (e.g., 110)) associated with the communication network (e.g., core network 112). The data cryptography service can encrypt or decrypt data using desired encryption and decryption algorithms to facilitate desirably securing and preventing unauthorized access to the data. The data coding service (e.g., encoding service, decoding service) can encode or decode data, and/or perform error correction on data, using desired encoding or decoding algorithms, and/or error correction algorithms, the UPF services can comprise services related to data communications between communication devices (e.g., 104, 106, 108, . . . ) associated with the core network 112, including services that can provide or enforce desired data forwarding, desired data communication rates (e.g., suitably fast data communication rates), desired quality of service (QoS) and/or quality of experience (QoE) (e.g., quality of user experience) associated with data communications between communication devices, and/or other core network features relating to data communications between communication devices. The slice service can generate or instantiate a service slice of the core network 112 and provide slice-related services for use by a communication device (e.g., communication device 104).

In accordance with various embodiments, the service management component 118 can be or can comprise an open networking automation platform (ONAP) component (not shown in FIG. 1) and/or a software-defined network (SDN) controller component (not shown in FIG. 1), such as more fully described herein, wherein the SDN controller component can be associated with the ONAP component, and wherein the SDN controller component can be or can comprise an SDN controller. The ONAP component can receive information relating to characteristics of a group of communication devices (e.g., a group comprising one or more communication devices) and/or information relating to service conditions associated with a subscription associated with and/or communication services being provided to the group of communication devices. The ONAP component (of or associated with the service management component 118) can determine or facilitate determining the characteristics of the group of communication devices (e.g., whether the device is stationary or mobile; type of communication device; and/or applications or functionality of the communication device; . . . ), and the service conditions associated with the group of communication devices (e.g., data is to be communicated by or to the group of communication devices at periodic times or dynamically; whether authentication is desired; whether charging services are desired; and/or whether UPF services are desired; . . . ). The ONAP component can instruct or notify the SDN controller component of the characteristics and service conditions associated with the group of communication devices to facilitate determining which services (e.g., 120, 122, and/or 124, . . . ) to select and instantiate, and instantiating the desired (e.g., selected) services.

The SDN controller component (of or associated with the service management component 118) can receive information (e.g., information relating to characteristics of the group of communication devices; information relating to service conditions associated with the subscription and/or the communication services being provided to the group of communication devices; and/or information indicating which services are to be instantiated with respect to the group of communication devices; . . . ) from the ONAP component. The SDN controller component can analyze such information, and based at least in part on the results of such analysis, the SDN controller component can determine which services (e.g., 120, 122, and/or 124, . . . ) are to be selected and instantiated (e.g., to create a subset of services), can create (e.g., dynamically create) an application comprising the desired (e.g., selected) services (e.g., microservices) for the group of communication devices, can instantiate or facilitate instantiating those services, and/or can instruct other components (e.g., RAN, UPF component, . . . ) of the core network 112 what services (e.g., 120, 122, and/or 124, . . . ) are being instantiated and utilized in connection with data communications for the group of communication devices.

At a desired time(s), the service management component 118 (employing the ONAP component and/or SDN controller component) can create (e.g., dynamically create) an application for the group of communication devices (e.g., 104, 106, and/or 108, . . . ), wherein the application can comprise or be associated with the subset of services (e.g., 120, 122, and/or 124, . . . ) determined for the group of communication devices based at least in part on the results of analyzing the characteristics and service conditions associated with the group of communication devices. The service management component 118 (employing the ONAP component and/or SDN controller component) can instantiate or facilitate instantiating the subset of services (e.g., 120, 122, and/or 124, . . . ), and can manage the subset of services, as more fully described herein, to facilitate desirable communication of data by the group of communication devices and/or between the group of communication devices and another communication device(s) (e.g., communication device 110, or other communication device associated with the communication network). The desired time(s) for such creation of the application and instantiation of the subset of services (e.g., 120, 122, and/or 124, . . . ) can be determined (e.g., by the service management component 118) based at least in part on the service conditions associated with the group of services, the type of data to be communicated, and/or other factors. Such desired time(s), for example, can be periodic (e.g., once per month, once per week, once per day, . . . ), dynamically determined (e.g., in response to a condition(s) being satisfied), or upon request for data communication and/or use of the subset of services (e.g., a request by a communication device of the group of communication devices or a request from another communication device associated with an entity, such as a utility company).

In some embodiments, the system 100 can comprise, and the service management component 118 can be associated with (e.g., can comprise or can be communicatively connected to), a service repository component 126 that can store service-related information 128 (SVC INFO) regarding the services (e.g., 120, 122, and/or 124, . . . ), which can be instantiated and/or managed by the service management component 118. The service-related information 128 can comprise, for example, respective code, instructions, parameter data, information data, and/or other data of the respective services (e.g., services 120, 122, and/or 124, . . . ), wherein such service-related information 128 can be utilized by the service management component 118 or other components of the core network 112 to facilitate instantiating, managing, implementing, and/or utilizing desired services for communication devices (e.g., 104, 106, 108, . . . ) associated with the core network 112. The service management component 118 can be utilized to register or facilitate registering services (e.g., services 120, 122, 124, . . . ) with the service repository component 126. The service management component 118 can access the service repository component 126 to access the service-related information 128 (e.g., a desired portion of the service-related information 128) stored therein, wherein the service management component 118 can utilize the service-related information 128 to facilitate determining which services (e.g., services 120, 122, and/or 124, . . . ) to select for a group of communication devices, and instantiating and managing such services.

These and other aspects and embodiments of the disclosed subject matter will now be described with regard to the other drawings (as well as with further regard to FIG. 1).

Figure 2:
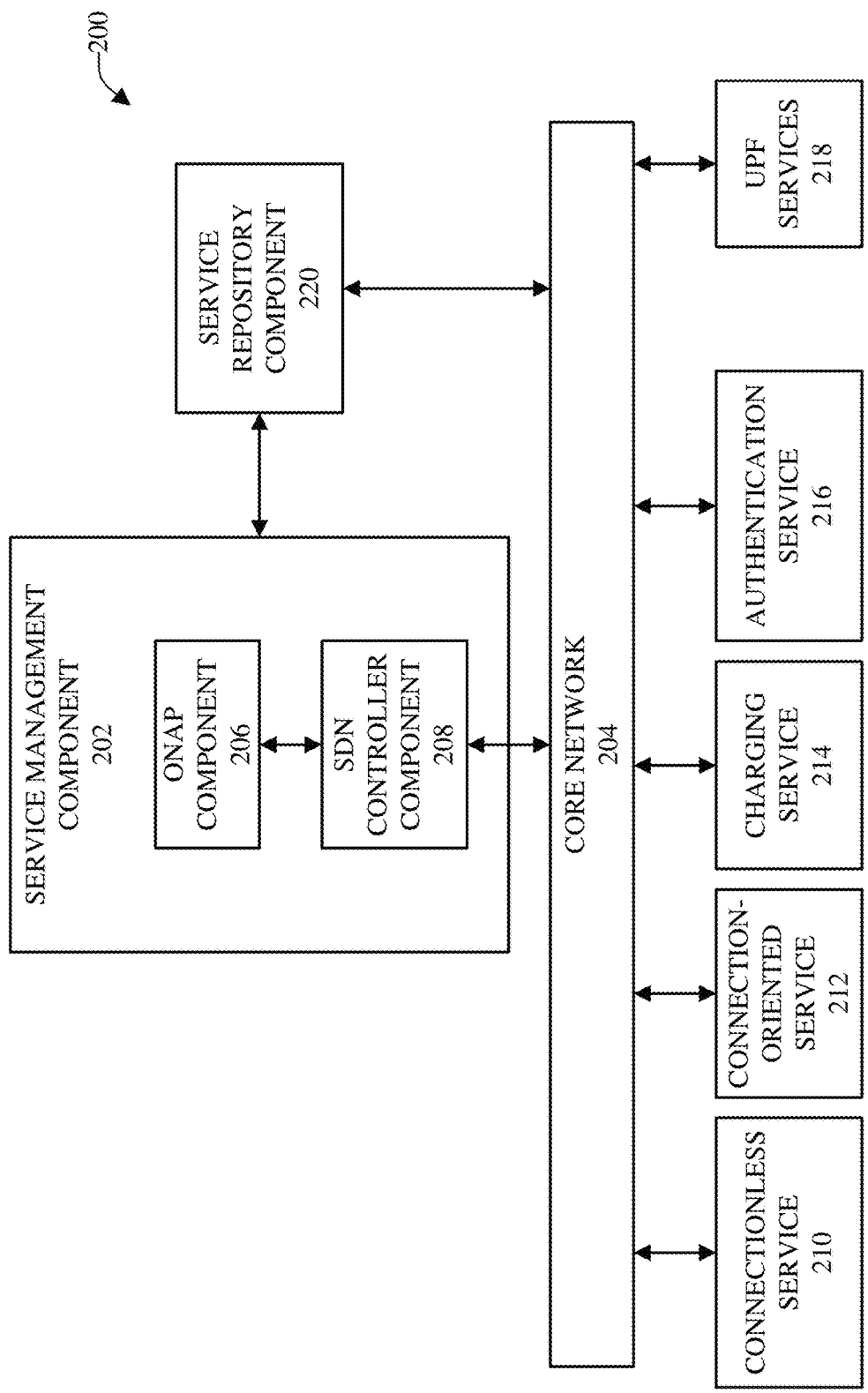
FIG. 2 illustrates a block diagram of an example, non-limiting system that can instantiate and manage services (e.g., microservices) to facilitate efficient communication of information between communication devices, in accordance with various aspects and embodiments of the disclosed subject matter.

Referring to FIG. 2 (along with FIG. 1), FIG. 2 illustrates a block diagram of an example, non-limiting system 200 that can instantiate and manage services (e.g., microservices) to facilitate efficient communication of information between communication devices, in accordance with various aspects and embodiments of the disclosed subject matter. The example non-limiting system 200 can be or represent an example microservice-based network architecture. The system 200 can comprise a service management component 202 that can manage services of the core network 204 and, at given times, can instantiate or facilitate instantiation of desired services that can used by or in connection with communication devices (e.g., 104, 106, 108, and/or 110, . . . ) associated with the core network, as more fully described herein.

In accordance with various embodiments, the service management component 202 can comprise or be associated with an ONAP component 206 and an SDN controller component 208, wherein the ONAP component 206 can be associated with (e.g., communicatively connected to) the SDN controller component 208. In some embodiments, the SDN controller component 208 can comprise or be associated with an API that can facilitate interaction and communication of information between the ONAP component 206 and the SDN controller component 208. The service management component 202, ONAP component 206, and SDN controller component 208 can be part of or associated with the core network 204. That is, while, in FIG. 2, the service management component 202, ONAP component 206, and SDN controller component 208 are depicted as being separate from the core network 204, in some embodiments, the service management component 202, ONAP component 206, and SDN controller component 208 can be part of the core network 204.

The core network 204 can provide a variety of services (e.g., microservices) to communication devices and associated entities (e.g., users, subscribers, customers) to facilitate communication of data (e.g., voice or other data) between communication devices. The services can comprise, for example, a connectionless service 210, a connection-oriented service 212, a charging service 214, an authentication service 216 (e.g., optimized authentication service), and UPF services 218. It is to be appreciated and understood that the core network 204 can provide other desired services, such as, for example, slice services, cryptography services (e.g., data encryption, data decryption), coding services (e.g., encoding, decoding, error detection and correction, . . . ), and/or other services. The services (e.g., 210, 212, 214, 216, and/or 218, . . . ) can be reusable by the core network 204 and service management component 202, wherein such services can be derived (e.g., by the service management component 202 or other system component) by decomposing mobility network functions of the core network 204 to form or create the respective services (e.g., microservices).

In some embodiments, respective services (e.g., 210, 212, 214, 216, and/or 218, . . . ) can comprise or be associated with respective APIs that can facilitate interaction and communication of information between the respective services and the core network 204, the SDN controller component 208, and/or other components of the system 200. Since the interaction for the respective services (e.g., 210, 212, 214, 216, and/or 218, . . . ) can be via the respective APIs over the core network 204, the respective services can be readily implemented in different types of networking technologies. This can facilitate desirable (e.g., optimal, suitable, and/or useful) and respective (e.g., different or unique) implementations of the respective services when such services are utilized for situations involving massive IoTs, situations involving smart devices, or situations involving other types of devices.

The connectionless service 210 can enable communication of data from a wireless communication device (e.g., communication device 104) to another communication device (e.g., communication device 110) without having to use mobility management functions and without having to establish a mobility communication connection or channel to communicate the data from the wireless communication device (e.g., communication device 104) to the other communication device (e.g., communication device 110). As more fully disclosed herein, there can be instances, such as, for example, when a wireless communication device (e.g., communication device 104) can be stationary (e.g., immobile, fixed at a location, and/or not moving). When the wireless communication device (e.g., communication device 104) is stationary, it is not necessary to use mobility management functions or a mobility communication connection or channel to communicate data from (or to) the wireless communication device via the core network 204. For instance, when the wireless communication device (e.g., communication device 104) is stationary, it is not necessary to establish or create a mobility communication tunnel (e.g., a GPRS tunneling protocol (GTP) tunnel) or bearers in the core network 204 (e.g., a mobility communication tunnel between a service gateway (SGW) node and a packet data network gateway (PGW) node) for the wireless communication device in connection with the data communication associated with the wireless communication device, and all or at least virtually all of the signaling and mobility management overhead (e.g., mobility header information) associated with the mobility management between the wireless communication device and core network 204, and signaling and mobility management overhead between nodes in the core network 204, can be bypassed in connection with the data communication associated with the wireless communication device, and also all or at least virtually all control plane functions of the control plane component (e.g., 114) can be bypassed in connection with the data communication associated with the wireless communication device.

Rather, data (e.g., voice or other data packets) can be communicated or forwarded from (or to) the wireless communication device (e.g., communication device 104) based at least in part on a data packet-based communication protocol, such as an Internet protocol (IP), as opposed to, or without, having to utilize a mobility communication protocol. For example, the data can be communicated or forwarded from (or to) the wireless communication device based at least in part on a destination network address (e.g., destination IP address) and a source network address (e.g., source IP address) associated with the data (e.g., data packet), in accordance with the data packet-based communication protocol (e.g., IP).

It is to be appreciated and understood that, while the disclosed subject matter often can utilize the connectionless service 210 when a communication device (e.g., communication device 104) is stationary, in certain embodiments, the disclosed subject matter can extend the use of the connectionless service 210 to communication devices when they are nomadic or mobile, as more fully described herein.

The connection-oriented service 212 can be utilized to establish or create a mobility communication connection that can be used to communicate data (e.g., voice or other data packets) between a wireless communication device (e.g., 104) and another communication device (e.g., 110). For instance, with regard to a wireless communication device that is mobile or moving, the connection-oriented service 212 can be employed to establish a mobility communication tunnel (e.g., GTP tunnel) and bearers, utilize mobility management functions, utilize control plane functions of the control plane component (e.g., 114), facilitate performing signaling related to wireless communications (e.g., mobile wireless communications), utilize mobility management overhead (e.g., header information related to mobile wireless communications), and/or perform other wireless communication related functions to facilitate communicating data between a wireless communication device (e.g., 104) and another communication device (e.g., 110).

The charging service 214 can perform and/or provide mobility-based charging, location-based charging, subscription-related charging, other communication-related charging, and/or other types of service charging (e.g., imposition of financial charges for services) in connection with data communications, applications, or other services associated with a communication device(s) (e.g., 104, 106, 108, and/or 110, . . . ). For instance, the charging service 214 can be utilized to monitor, track, and/or measure data communications and/or other communication-related services or features utilized by a communication device(s), and can charge or facilitate charging an account associated with the communication device(s) for the data communications and/or the user of such other communication-related services or features. The charges imposed by the charging service 214 can be on a per service basis and/or a subscription basis.

The authentication service 216 (e.g., optimized authentication service) can employ authentication and a desired authentication protocol to secure data being communicated between communication devices (e.g., between wireless communication device (e.g., 104) and another communication device (e.g., 110)). For example, the authentication service 216 can be utilized to authenticate or verify that a device (e.g., wireless communication device (e.g., 104)) is authorized to communicate or receive data to or from another communication device (e.g., 110), based at least in part on authentication credentials (e.g., device identifier (ID), username, password or passcode, IP address, and/or other desired authentication credential(s)), and vice versa. The authentication service 216 can employ one or more desired authentication protocols to facilitate securing data communications between communication devices associated with the core network 204.

The UPF services 218 can comprise services related to data communications between communication devices associated with the core network 204, including services that can provide or enforce desired data forwarding, desired data communication rates (e.g., suitably fast data communication rates), desired QoS and/or QoE associated with data communications between communication devices, and/or other core network features relating to data communications between communication devices. For example, the UPF services 218 can be utilized to set, provide, and/or enforce threshold (e.g., minimum threshold) data communication rates, threshold (e.g., minimum threshold) QoS, and/or threshold (e.g., minimum threshold) QoE, in connection with data communications associated with the communication device(s) (e.g., 104, 106, 108, and/or 110, . . . ). The QoS can relate to, for example, threshold (e.g., minimum threshold, maximum threshold, or threshold range, as applicable) packet loss, bit rate, throughput, transmission delay, jitter, and/or other communication-related factors.

The service management component 202 or other system component can store service information (e.g., service-related information) regarding the services (e.g., 210, 212, 214, 216, and/or 218, . . . ) in a service repository component 220. The service information can comprise respective items of service information associated with respective services (e.g., 210, 212, 214, 216, and/or 218, . . . ), wherein the respective items of service information can comprise identification information that can identify a service, function-related information (e.g., code, parameters, or other information) that can be used to perform or facilitate performing functions of the service, and/or other desired information. The service management component 202 can access and/or retrieve desired service information from the service repository component 220 to facilitate determining which services (e.g., 210, 212, 214, 216, and/or 218, . . . ) to utilize in connection with a communication device(s) (e.g., 104, 106, or 108, . . . ) and/or to instantiate or facilitate instantiating one or more of the services for use in connection with the communication device(s).

The service management component 202 can receive, obtain, or detect information relating to characteristics and service conditions associated with the communication device (e.g., wireless communication device). Such information relating to characteristics and service conditions can be received, obtained, or detected from the communication device by the service management component 202 and/or from another device associated with an entity (e.g., service provider, utility company, or other user or entity).

The service management component 202 can analyze the information relating to the characteristics and service conditions associated with the communication device(s) (e.g., 104, 106, and/or 108, . . . ). The characteristics associated with the communication device(s) can comprise, for example, a characteristic that can relate to whether the communication device(s) is stationary (e.g., immobile) or mobile (e.g., a smart phone that is moving and/or can be readily moved) and/or other characteristics associated with the communication device(s) (e.g., type of communication device, type of application(s) to be used by the communication device, . . . ), such as more fully described herein. The service conditions associated with the communication device(s) can comprise, for example, a time period that the communicating of the data (e.g., voice or other data) is to occur, a data type of the data, an amount of the data to be communicated, whether the data is to be encrypted, whether the data is to be secured by an authentication protocol or service (e.g., optimized authentication service), whether a financial charge is associated with the communicating of the data, and/or whether a service slice is to be instantiated to facilitate the communicating of the data.

The service management component 202 can determine a subset of a set of services (e.g., microservices) to be used for the communication device(s) (e.g., 104, 106, and/or 108, . . . ) based at least in part on the analysis of the characteristics (e.g., whether the communication device is stationary or mobile) and service conditions associated with the communication device(s). For instance, in response to determining that the communication device(s) (e.g., 104, 106, and/or 108, . . . ) is stationary, the service management component 202 can determine that a connectionless service 210 is to be included in the subset of services and utilized to facilitate communication of data (e.g., voice or other data). As an example, if, based at least in part on the analysis, the service management component 202 determines that a charging service 214 is to be utilized to satisfy a service condition associated with the communication device(s) (e.g., 104, 106, and/or 108, . . . ), the service management component 202 can determine that the charging service 214 is to be included in the subset of services to facilitate tracking and applying the appropriate financial (or other type of) charges to the account(s) associated with the communication device(s) in connection with the communication of data from (or to) the communication device(s) (e.g., 104, 106, and/or 108, . . . ) to (or from) another communication device (e.g., communication device 110). As another example, if, based at least in part on the analysis, the service management component 202 determines that an authentication service is a service condition associated with the communication device(s), the service management component 202 can determine that the authentication service 216 and associated protocol is to be included in the subset of services to facilitate employing desired authentication in connection with the communication of data from (or to) the communication device(s) (e.g., 104, 106, and/or 108, . . . ) to (or from) another communication device (e.g., communication device 110).

At a desired time(s) (e.g., periodically, dynamically, or upon request), the service management component 202 can instantiate or facilitate instantiating the subset of services (e.g., connectionless service 210, charging service 214, authentication service 216, and/or other service . . . ) to facilitate communicating data associated with the communication device(s) (e.g., to facilitate communicating data from the communication device(s) to another communication device or vice versa). For example, if it is determined that the respective data (e.g., respective utility use data) of the respective communication devices (e.g., communication devices 104, 106, and 108, which can be smart meters, for example) is to be communicated from the respective communication devices to a communication device (e.g., 110) associated with a service provider (e.g., utility service provider) on a particular date each month, on the particular date each month, the service management component 202 can instantiate or facilitate instantiating the subset of services (e.g., connectionless service 210, charging service 214, and/or authentication service 216, . . . ), and such subset of services can be used to facilitate or in connection with communicating the respective data, via the core network 204, from the communication devices (e.g., 104, 106, and 108) to the communication device (e.g., 110) associated with the service provider.

It is to be appreciated and understood that, while the service management component 202 can determine that the connectionless service 210 can be included in the subset of services for a communication device(s) (e.g., 104, 106, and/or 108, . . . ) based at least in part on determining that a characteristic of the communication device(s) is that it is stationary, in certain embodiments, the service management component 202 can determine that the connectionless service 210 can be utilized with regard to a communication device(s) (e.g., 104, 106, and/or 108, . . . ) that is determined to be mobile or nomadic. For example, based at least in part on the analysis of the information relating to the characteristics and service conditions associated with the communication device(s) (e.g., 104, 106, and/or 108, . . . ), the service management component 202 can determine that one characteristic of the communication device(s) (e.g., a wireless communication device(s) is that the communication device(s) is mobile or nomadic, wherein the communication device(s) can be moving or can be sitting in one place (e.g., can be mobile or nomadic, but can be temporarily sitting in one place). In certain embodiments, based at least in part on at least one other characteristic and/or a service condition associated with the communication device(s) (e.g., 104, 106, and/or 108, . . . ) as determined from the analysis, the service management component 202 can determine that the connectionless service 210 is suitable for use with the communication device(s) (e.g., 104, 106, and/or 108, . . . ), even though the communication device(s) is mobile or nomadic, and can determine that the connectionless service 210 is to be included in the subset of services for the communication device(s). The at least one other characteristic can relate to, for example, the type of communication device, the type of data being communicated, whether the communication device(s) is transmitting the data or receiving the data, whether the communication device(s) is sitting in one place, whether the data is able to be communicated from or to the communication device(s) (e.g., 104, 106, and/or 108, . . . ) without establishing a mobility communication tunnel and/or using other mobility management functions, and/or another characteristic associated with the communication device(s).

Figure 3:
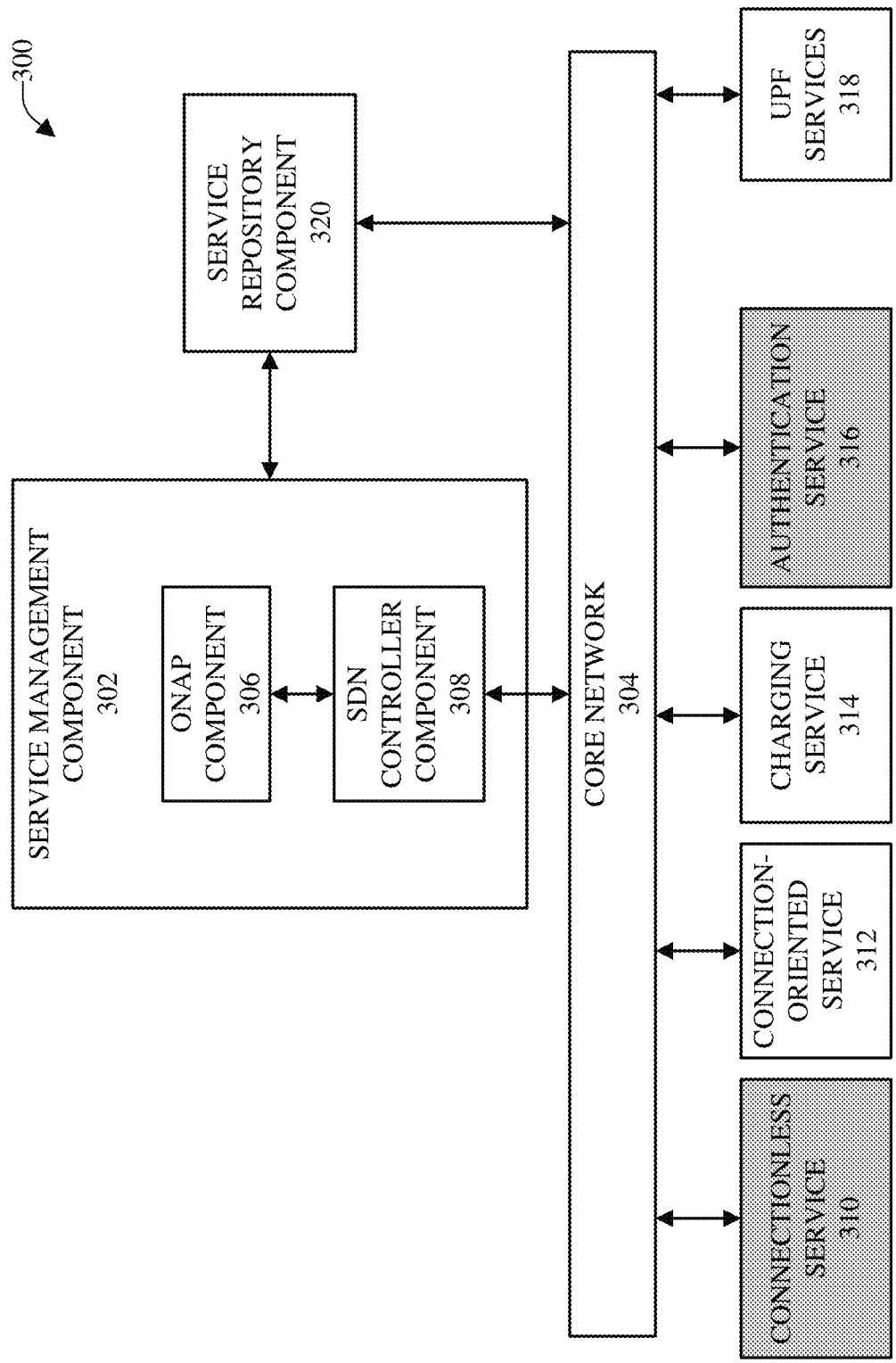
FIG. 3 depicts a block diagram of an example, non-limiting system that can instantiate and manage services (e.g., microservices) to facilitate efficient communication of information between communication devices, such as Internet of Thing (IoT)-type devices, in accordance with various aspects and embodiments described herein.

Turning to FIG. 3 (along with FIG. 1), FIG. 3 depicts a block diagram (e.g., a conceptual diagram) of an example, non-limiting system 300 that can instantiate and manage services (e.g., microservices) to facilitate efficient communication of information between communication devices, such as IoT-type devices, in accordance with various aspects and embodiments described herein. The example non-limiting system 300 can be or represent an example massive IoTs service domain using microservices.

In an example non-limiting embodiment, the system 300 can be employed to instantiate, manage, and provide communication services, including certain desired services (e.g., microservices), to a utility company (e.g., electric company, gas company, or water company, . . . ) with respect to meter reading of a plurality (e.g., thousands, tens of thousands, or hundreds of thousands, . . . ) of communication devices, including communication devices 104, 106, 108, etc., which can be, or can be associated with, smart meters, of the customers of the utility company and communication of data (e.g., smart meter or customer identification data, utility usage data, or other desired data) between the plurality of communication devices (e.g., 104, 106, 108, . . . ) and a communication device 110 of the utility company. For instance, the utility company can purchase (e.g., via a subscription or contract) the communication services from the service provider (e.g., mobile service provider) associated with (e.g., operating or otherwise affiliated with) the core network 304 to have such data communicated at desired times (e.g., periodically, such as once per month; or upon request) from the plurality of communication devices (e.g., 104, 106, 108, . . . ) to the communication device 110 of the utility company, and/or to have data (e.g., software or firmware updates) communicated from the communication device to the plurality of communication devices (e.g., 104, 106, 108, . . . ).

The system 300 can comprise a service management component 302 that can manage services of the core network 304 and, at desired times (e.g., periodically, such as once per month; dynamically (e.g., in response to conditions); or upon request), can instantiate or facilitate instantiation of desired services that can used by or in connection with communication devices (e.g., 104, 106, 108, . . . ) associated with the core network 304, as more fully described herein. In accordance with various embodiments, the service management component 302 can comprise or be associated with an ONAP component 306 and an SDN controller component 308 that can be associated with (e.g., communicatively connected to) the ONAP component 306. In certain embodiments, the SDN controller component 308 can comprise or be associated with an API that can facilitate interaction and communication of information between the ONAP component 306 and the SDN controller component 308. The service management component 302, ONAP component 306, and SDN controller component 308 can be part of or associated with the core network 304. The core network 304 can make available or provide a variety of services (e.g., microservices) to communication devices and associated entities (e.g., users, subscribers, customers) to facilitate communication of data (e.g., voice or other data) between communication devices. The services can comprise, for example, a connectionless service 310, a connection-oriented service 312, a charging service 314, an authentication service 316, UPF services 318, and/or other services (e.g., slice services, cryptography services, coding services, . . . ).

In certain embodiments, respective services (e.g., 310, 312, 314, 316, and/or 318, . . . ) can comprise or be associated with respective APIs that can facilitate interaction and communication of information between the respective services and the core network 304, the SDN controller component 308, and/or other components of the system 300. Since the interaction for the respective services (e.g., 310, 312, 314, 316, and/or 318, . . . ) can be via the respective APIs over the core network 304, the respective services can be readily implemented in different types of networking technologies. This can facilitate desirable (e.g., optimal, suitable, and/or useful) and respective (e.g., different or unique) implementations of the respective services when such services are utilized for situations involving massive IoTs, situations involving smart devices, or situations involving other types of devices.

The service management component 302 can receive, obtain, or detect information relating to characteristics and service conditions associated with communication devices (e.g., wireless communication devices), such as communication devices 104, 106, and 108. Such information relating to characteristics and service conditions can be received, obtained, or detected from the communication devices (e.g., 104, 106, 108) by the service management component 302 and/or from another communication device, such as communication device 110, associated with the utility company or another entity.

The service management component 302 can analyze the information relating to the characteristics and service conditions associated with the communication devices (e.g., 104, 106, and 108). The information relating to the characteristics associated with the communication devices (e.g., 104, 106, and 108) can indicate, for example, that the communication devices are stationary (e.g., immobile). The information relating to the service conditions associated with the communication device(s) can indicate, for example, that authentication is desired in connection with the communication of data from (or to) the communication devices to facilitate securing the data and ensuring that the communication devices (e.g., 104, 106, and 108) (and associated users) and the communication device 110 (and associated entity), which will be communicating with the communication devices (e.g., 104, 106, and 108), are authorized devices (and authorized users or entity) with respect to the data being communicated.

Based at least in part on the results of the analysis of the information relating to the characteristics and service conditions associated with the plurality of communication devices (e.g., 104, 106, 108, . . . ), the service management component 302 can determine a subset of a set of services (e.g., microservices) to be used for the plurality of communication devices (e.g., 104, 106, 108, . . . ), wherein the subset of services comprises the connectionless service 310 and the authentication service 316. For instance, in response to determining that the plurality of communication devices (e.g., 104, 106, and 108, . . . ) are stationary based at least in part on the results of the analysis of the information relating to the characteristics and service conditions, the service management component 302 can determine that the connectionless service 310 is to be included in the subset of services and utilized to facilitate communication of data (e.g., voice or other data). That is, since the plurality of communication devices (e.g., 104, 106, 108, . . . ) are stationary (e.g., do not move), instead of using a typical wireless communication device model (e.g., a smart device model) that can involve a significant amount of signaling and resources (e.g., mobility management functions and resources) to set up a mobile communication connection to communicate a relatively small amount of data (e.g., utility usage data, and/or smart meter or customer identification data), the service management component 302 (e.g., employing the ONAP component 306) can instruct the mobile core network 304 to dynamically create (e.g., at the desired time(s)) an application, comprising the connectionless service 310 and other desired services, for the utility company for use in efficiently communicating data from the plurality of communication devices (e.g., 104, 106, 108, . . . ) to the communication device 110 associated with the utility company, as the connectionless service 310 can be suitable and more efficient for this type of massive stationary IoTs (e.g., a large number of wireless communication devices, such as wireless smart meters) than using the connection-oriented service 312.

Also, in response to determining that authentication is desired in connection with the communication of data from (or to) the communication devices (e.g., 104, 106, and 108, . . . ) based at least in part on the results of the analysis of the information relating to the characteristics and service conditions, the service management component 302 can determine that the authentication service 316 (e.g., optimized authentication service) is to be included in the subset of services to facilitate employing desired authentication in connection with the communication of data from (or to) the communication devices to (or from) the other communication device (e.g., communication device 110).

At the desired time(s), the service management component 302 can create (e.g., dynamically create) an application by selecting and instantiating, or facilitating instantiating, the subset of services (e.g., connectionless service 310 and authentication service 316), and the subset of services can be utilized in connection with communication of data from the plurality of communication devices (e.g., 104, 106, 108, . . . ) to the communication device 110, or vice versa. The plurality of communication devices (e.g., 104, 106, 108, . . . ) can utilize the connectionless service 310 to communicate (or receive) data to (or from) the communication device 110, without the plurality of communication devices having to establish a mobility communication connection, as more fully described herein, wherein the authentication service 316 can be utilized to facilitate secure data communications between the plurality of communication devices (e.g., 104, 106, 108, . . . ) and the communication device 110.

Figure 4:
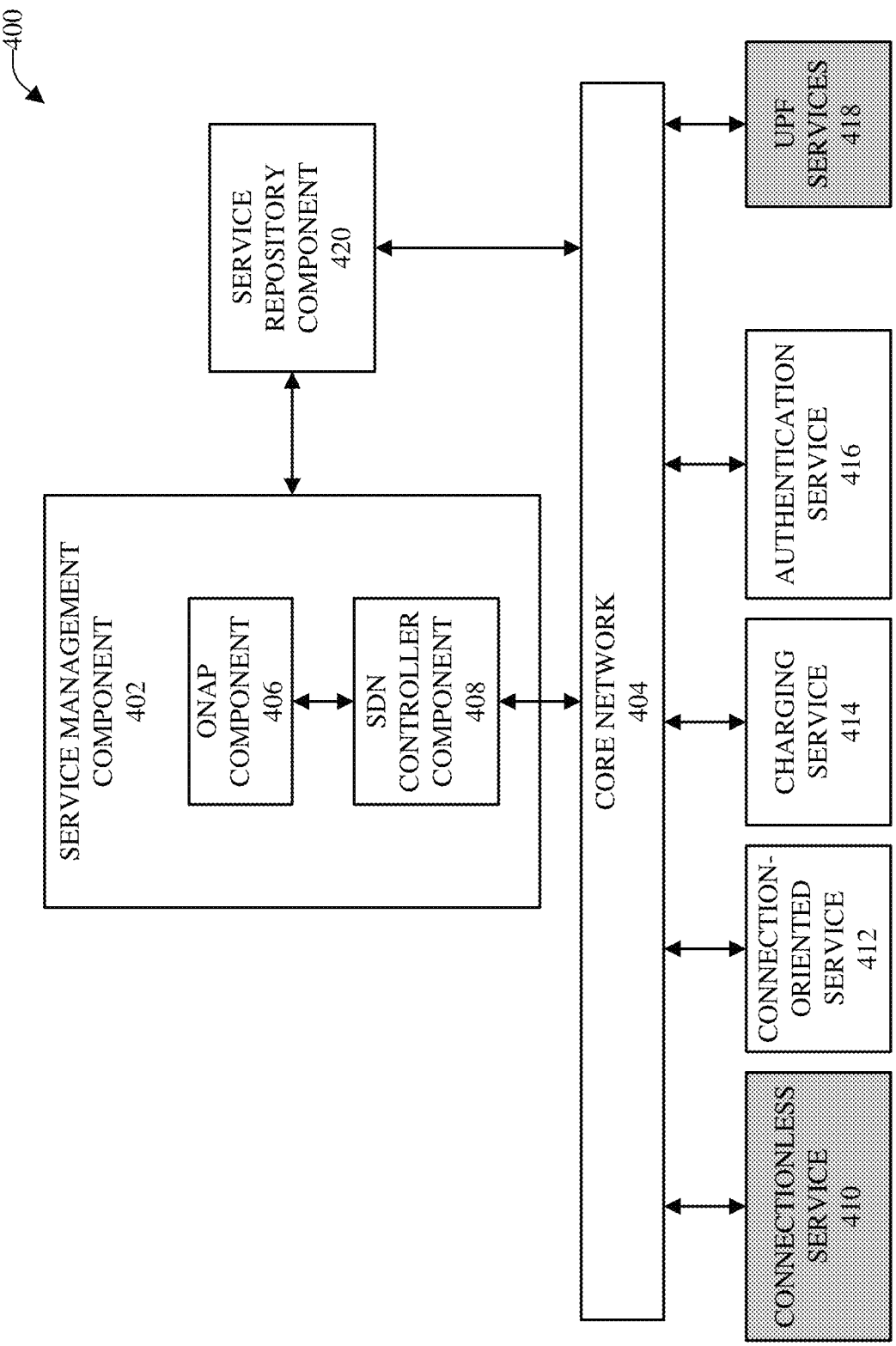
FIG. 4 presents a block diagram of an example, non-limiting system that can instantiate and manage services (e.g., microservices) to facilitate providing desirable and efficient communication services (e.g., wireless broadband services) to facilitate communication of information between communication devices, in accordance with various aspects and embodiments of the disclosed subject matter.

Referring briefly to FIG. 4 (along with FIG. 1), FIG. 4 presents a block diagram of an example, non-limiting system 400 that can instantiate and manage services (e.g., microservices) to facilitate providing desirable and efficient communication services (e.g., wireless broadband services) to facilitate communication of information between communication devices, in accordance with various aspects and embodiments of the disclosed subject matter. The example non-limiting system 400 can be or represent an example fixed broadband service domain using microservices.

In an example non-limiting embodiment, the system 400 can be employed to instantiate, manage, and provide communication services, including certain desired services (e.g., microservices), to a group of homes and/or apartments that are being built by a real estate developer. The real estate developer can desire to provide fixed broadband wireless communication services (e.g., 5G or other next generation broadband wireless communication services) to the homes and/or apartments. For instance, the homes and/or apartments can be located in an area that does not provide suitable (e.g., suitably fast) broadband communication services, and the real estate developer is desiring to have suitable fixed broadband wireless communication services provided to the homes and/or apartments. The real estate developer can purchase such suitable fixed broadband wireless communication services from a mobile service provider, which can own, operate, manage, implement, employ, or otherwise be associated with the system 400, including the core network 404 and associated components, features, and services. Respective communication devices (e.g., 104, 106, 108, . . . ) can be installed at or in respective homes and/or apartments for which the real estate developer desires such fixed broadband wireless communication services. In some embodiments, the communication devices (e.g., 104, 106, 108, . . . ) can be or can comprise wireless transceivers that can be utilized to receive or transmit data (e.g., voice or other data), wherein other communication devices (e.g., mobile phones, computers, IPTVs, electronic tablets or pads, electronic gaming devices, . . . ) (not shown in FIG. 1 or 4) of users who live in or are located in the homes and/or apartments can connect to the communication devices (e.g., 104, 106, 108, . . . ), e.g., the wireless transceivers, in order to connect to the mobile core network 404 and/or the Internet, and, via the communication devices (e.g., 104, 106, 108, . . . ), can communicate with (e.g., transmit data to or receive data from) other communication devices that are associated with the mobile core network 404 and/or the Internet.

The system 400 can comprise a service management component 402 that can manage services of a core network 404 and, at desired times (e.g., dynamically; periodically; or upon request), can instantiate or facilitate instantiation of desired services that can used by or in connection with communication devices (e.g., 104, 106, 108, . . . ) associated with the core network 404, as more fully described herein. In accordance with various embodiments, the service management component 402 can comprise or be associated with an ONAP component 406 and an SDN controller component 408 that can be associated with (e.g., communicatively connected to) the ONAP component 406. In some embodiments, the SDN controller component 408 can comprise or be associated with an API that can facilitate interaction and communication of information between the ONAP component 406 and the SDN controller component 408. The service management component 402, ONAP component 406, and SDN controller component 408 can be part of or associated with the core network 404. The core network 404 can make available or provide a variety of services (e.g., microservices) to communication devices and associated entities (e.g., users, subscribers, customers) to facilitate communication of data (e.g., voice or other data) between communication devices. The services can comprise, for example, a connectionless service 410, a connection-oriented service 412, a charging service 414, an authentication service 416, UPF services 418, and/or other services (e.g., slice services, cryptography services, coding services, . . . ).

In certain embodiments, respective services (e.g., 410, 412, 414, 416, and/or 418, . . . ) can comprise or be associated with respective APIs that can facilitate interaction and communication of information between the respective services and the core network 404, the SDN controller component 408, and/or other components of the system 300. Since the interaction for the respective services (e.g., 410, 412, 414, 416, and/or 418, . . . ) can be via the respective APIs over the core network 404, the respective services can be readily implemented in different types of networking technologies. This can facilitate desirable (e.g., optimal, suitable, and/or useful) and respective (e.g., different or unique) implementations of the respective services when such services are utilized for situations involving massive IoTs, situations involving smart devices, or situations involving other types of devices.

The service management component 402 can receive, obtain, or detect information relating to characteristics and service conditions associated with the communication devices (e.g., 104, 106, 108, . . . ) installed at or in the homes and/or apartments. Such information relating to characteristics and service conditions can be received, obtained, or detected from the communication devices (e.g., 104, 106, 108, . . . ) by the service management component 402 and/or from another communication device, such as communication device 110, associated with the real estate developer or another entity.

The service management component 402 can analyze the information relating to the characteristics and service conditions associated with the communication devices (e.g., 104, 106, 108, . . . ). The information relating to the characteristics associated with the communication devices (e.g., 104, 106, 108, . . . ) can indicate, for example, that the communication devices are stationary (e.g., fixed in position or immobile). The information relating to the service conditions associated with the communication device(s) can indicate, for example, that UPF services 418 (e.g., certain data communication speeds, QoS, and/or QoE, . . . ) are desired in connection with the broadband fixed wireless communication services being provided to the homes and/or apartments.

Based at least in part on the results of the analysis of the information relating to the characteristics and service conditions associated with the communication devices (e.g., 104, 106, 108, . . . ), the service management component 402 can determine a subset of a set of services (e.g., microservices) to be used for the communication devices (e.g., 104, 106, 108, . . . ), wherein the subset of services comprises the connectionless service 410 and the UPF services 418. For instance, in response to determining that the communication devices (e.g., 104, 106, and 108, . . . ) are stationary based at least in part on the results of the analysis of the information relating to the characteristics and service conditions, the service management component 402 can determine that the connectionless service 410 is to be included in the subset of services and utilized to facilitate communication of data (e.g., voice or other data) from or to the communication devices (e.g., 104, 106, and 108, . . . ). That is, since the communication devices (e.g., 104, 106, 108, . . . ) are stationary (e.g., fixed at the homes or apartments and do not move), instead of using a typical wireless communication device model (e.g., smart device model) that can involve a significant amount of signaling and resources (e.g., mobility management functions and resources) to set up a mobile communication connection to communicate data between the communication devices (e.g., 104, 106, 108, . . . ) and the mobile core network 404 and/or Internet, the service management component 402 (e.g., employing the ONAP component 406) can instruct the mobile core network 404 to dynamically create an application, comprising the connectionless service 410 and other desired services, for use in efficiently communicating data between the communication devices (e.g., 104, 106, 108, . . . ) and the mobile core network 404 and/or Internet (and other associated communication devices), as the connectionless service 410 can be suitable and more efficient for this type of stationary IoTs (e.g., a relatively large number of wireless communication devices, such as wireless transceivers) than using the connection-oriented service 412.

Also, in response to determining that UPF services are desired as part of the broadband fixed wireless communication services being provided to the communication devices (e.g., 104, 106, 108, . . . ) based at least in part on the results of the analysis of the information relating to the characteristics and service conditions, the service management component 402 can determine that the UPF services 418 (e.g., certain data communication speeds, QoS, and/or QoE, . . . ) are to be included in the subset of services provided as part of the broadband fixed wireless communication services for the communication devices (e.g., 104, 106, 108, . . . ).

The service management component 402 can create (e.g., dynamically create) an application for the communication devices (e.g., 104, 106, 108, . . . ) by selecting and instantiating, or facilitating instantiating, the subset of services (e.g., connectionless service 410 and UPF services 418) for the communication devices (e.g., 104, 106, 108, . . . ), and the subset of services can be utilized in connection with providing the broadband fixed wireless communication services for the communication devices (e.g., 104, 106, 108, . . . ) of the homes and/or apartments. The communication devices (e.g., 104, 106, 108, . . . ) can utilize the connectionless service 310 to communicate (or receive) data to (or from) the mobile core network 404, Internet, and/or other communication devices associated thereto, without the communication devices having to establish a mobility communication connection, as more fully described herein, and the UPF services 418 can provide the desired data communication speeds, QoS, QoE, and/or other UPF services to the communication devices (e.g., 104, 106, 108, . . . ).

The disclosed subject matter (e.g., by employing the service management component and desirably selecting and using (e.g., reusing) services for respective communication devices) thus can leverage the benefits of services (e.g., microservices) and their runtime management, and can thereby dynamically, readily, and/or automatically scale the services based at least in part on the load, and services can be dynamically, readily, and/or automatically recovered after a failure (e.g., a system or service failure). As disclosed, the services (e.g., microservices) can be container-based service implementations that can be deployed and managed by an unshared container, wherein, for example, containers can manage the infrastructure and dependencies and handles all of the I/O, monitoring, and security overhead (environment), while the application can be free to execute business processes, and wherein each microservice instance can run in its own container.

Figure 5:
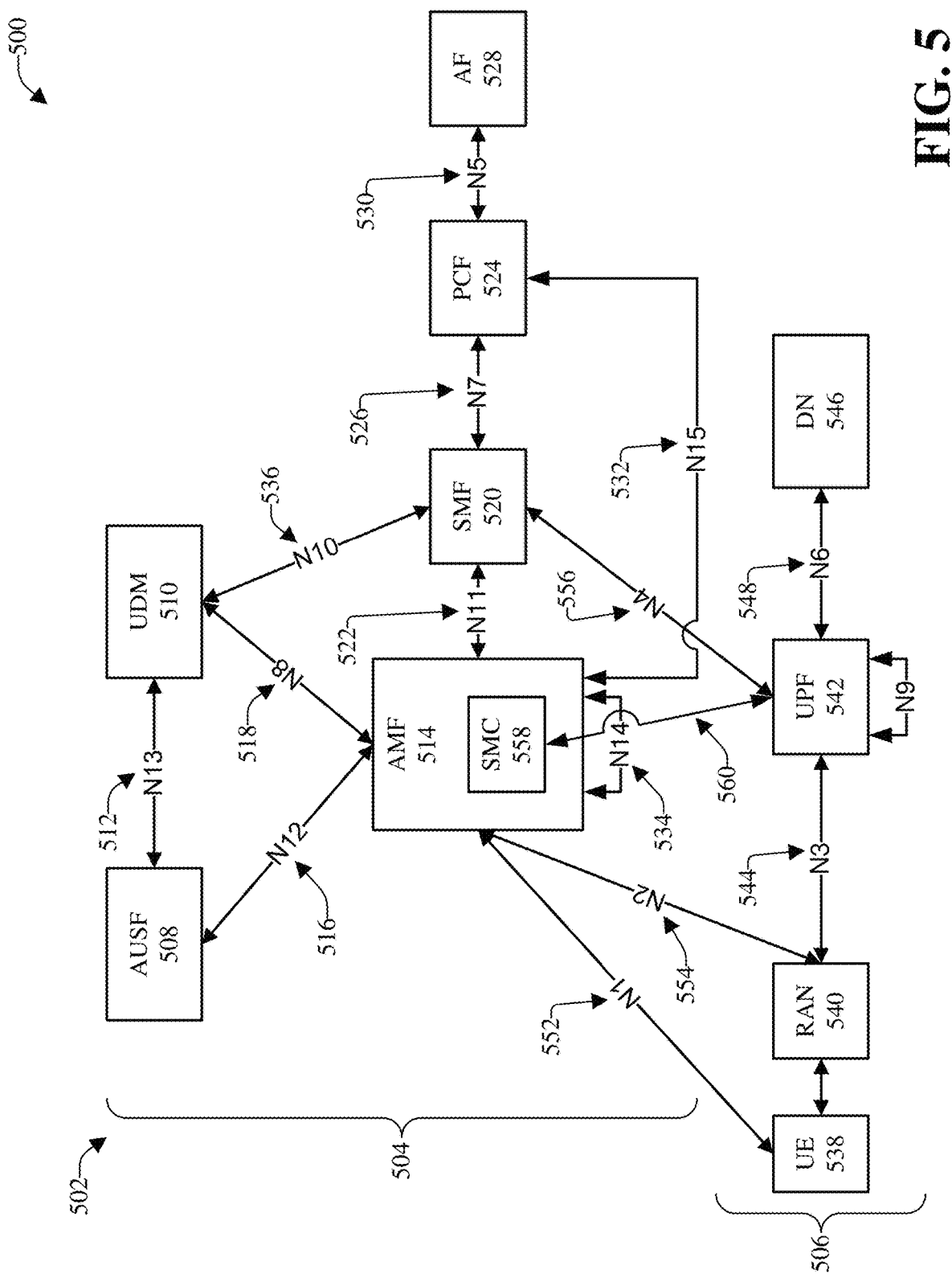
FIG. 5 illustrates a diagram of an example, non-limiting system that can comprise an enhanced core network that can be configured to facilitate instantiating, providing, and managing services (e.g., microservices) to facilitate efficient communication of information between communication devices, in accordance with various aspects and embodiments of the disclosed subject matter.

Turning to FIG. 5 (along with FIG. 1), FIG. 5 illustrates a diagram of an example, non-limiting system 500 that can comprise an enhanced core network that can be configured to facilitate instantiating, providing, and managing services (e.g., microservices) to facilitate efficient communication of information between communication devices, in accordance with various aspects and embodiments of the disclosed subject matter. The system can comprise the core network 502 (e.g., enhanced core network), which can include a control plane 504 and a user plane 506.

The control plane 504 can comprise a variety of components and interfaces that can perform various functions. For instance, the control plane 504 can comprise an authentication server function (AUSF) component 508 that can be associated with (e.g., interfaced with or connected to) a unified data management (UDM) component 510 via an interface 512 (N13 interface). The control plane 504 also can include a core access and mobility management function (AMF) component 514 that can be associated with the AUSF component 508 via an interface 516 (N12 interface) and the UDM component 510 via an interface 518 (N8 interface). The AMF component 514 also can be associated with a session management function (SMF) component 520 via an interface 522 (N11 interface). The SMF component 520 also can be associated with a policy control function (PCF) component 524 via an interface 526 (N7 interface). The PCF component 524 also can be associated with an application function (AF) 528 via an interface 530 (N5 interface). The AMF component 514 also can be associated with the PCF component 524 via an interface 532 (N15 interface). Further, the AMF component 514 can comprise an interface 534 (N14 interface) that can interface one part (a sub-component) of the AMF component 514 with other part (another sub-component) of the AMF component 514. The UDM component 510 also can be associated with the SMF component 520 via an interface 536 (N10 interface).

The user plane 506 can comprise one or more UEs, such as UE 538, and a RAN 540, which can be associated with (e.g., wirelessly connected to) the one or more UEs, including UE 538. The user plane 506 also can include a UPF component 542 that can be associated with the RAN 540 via an interface 544 (N3 interface). The user plane 506 further can include a data network (DN) component 546, which can be associated with the UPF component 542 via an interface 548 (N6 interface). The UPF component 542 also can comprise an interface 550 (N9 interface) that can interface one part (a sub-component) of the UPF component 542 with other part (another sub-component) of the UPF component 542.

Certain components of the control plane 504 can be associated with (e.g., interfaced with) components of the user plane 506. For instance, the AMF component 514 can be associated with the UE 538 via an interface 552 (N1 interface), and can be associated with the RAN 540 via an interface 554 (N2 interface). The SMF component 520 can be associated with the UPF component 542 via an interface 556 (N4 interface).

The AUSF component 508 can comprise an authentication server function, wherein the AUSF component 508 can comprise an authentication server that can perform authentication functions to facilitate authenticating UEs, such as UE 538, and can store authentication data that can be utilized to facilitate authenticating the UEs, such as UE 538. The UDM component 510 can store subscription information (e.g., subscriber profile information) relating to subscriptions of UEs, such as UE 538. In some embodiments, in connection with authentication of a UE 538 and/or an associated user, the AUSF 508 can obtain authentication information (e.g., authentication credentials) from the UDM component 510.

The AMF component 514 can comprise an access and mobility function, wherein the AMF component 514 can perform mobility management functions, connection management functions, authentication functions, access authorization, location-related services management, and/or other functions in connection with authenticating a UE (e.g., UE 538) and/or associated user, granting the UE (e.g., an authenticated or authorized UE) access to the core network 502 and associated services, establishing and managing a communication connection (e.g., a mobile or wireless communication connection) for the UE with the core network 502, providing location-based services to the UE, and/or performing other functions for the UE. The SMF component 520 can perform session management functions (e.g., establishment, modification, and release) for communication sessions involving UEs, such as UE 538. The SMF component 520 also can facilitate determining or selecting UPFs to be used for communication sessions involving the UEs.

The PCF component 524 can comprise and implement a policy control function that can support a unified policy framework for the core network 502, can facilitate policy control for the core network 502, and can apply desired (e.g., appropriate, suitable, or applicable) policies, including providing desired policy rules to other functions (e.g., functions of the AUSF component 508, UDM component 510, AMF component 514, . . . ) of the control plane 504 to facilitate application and enforcement of the desired policy rules. The AF component 528 can comprise an application function that can provide information regarding packet flows associated with UEs (e.g., UE 538) to desired components (e.g., PCF component 524 or other components of the core network 502) to facilitate supporting or providing desired QoS.

The UPF component 542 can comprise a user plane function that can provide or facilitate providing policy enforcement in the user plane 506, routing and forwarding of data packets in the core network 502, inspection of data packets, QoS management and enforcement in the core network 502, downlink buffering of data packets, and/or other functions. The UPF component 542 also can act or operate as an external protocol data unit (PDU) session point of interconnect to the DN component 546. The UPF component 542 further can be an anchor point for intra- and inter-RAT mobility. The SMF component 520 can control the UPF component 542 via the interface 556 (N4 interface). The DN component 546 can comprise a data network that can facilitate access to the Internet, operator services, third-party services, or other data-related services.

In accordance with various embodiments, the system 500 can comprise a service management component 558 (also referred to as SMC) that can be part of or associated with the AMF component 514. The service management component 558 can comprise or be associated with an ONAP component and/or an SDN controller component, as more fully described herein, and the service management component 558 can comprise the same or similar functionality, and can perform the same or similar functions and operations, as described herein with regard to the service management component.

The core network 502 (e.g., enhanced core network) can be enhanced and configured to support and provide connectionless services, as well as other services (e.g., microservices), to wireless communication devices (e.g., massive IoTs or other communication devices for which connectionless service is determined to be suitable). In some embodiments, the interface 544 (the N3 interface) can be enhanced or configured to support connectionless services for wireless communication devices (e.g., communication devices 104, 106, 108, . . . ) associated with the core network 502. For instance, the enhanced core network 502 can employ a mobile edge at the interface 544 (the N3 interface) that can host virtual RAN (vRAN) and UPF microservices, including connectionless microservices, and/or other desired functions and services.

In certain embodiments, the interface 548 (the N6 interface) and/or the interface 550 (the N9 interface) can be enhanced or configured to support connectionless services and/or other microservices for wireless communication devices (e.g., communication devices 104, 106, 108, . . . ) associated with the core network 502. This can allow desirably flexible distribution of connectionless microservices based at least in part on the specifications or conditions of or associated with an application.

In accordance with various embodiments, the interface 554 (the N2 interface) (e.g., the control plane (504) to user plane (506) interface) can be enhanced or configured to support the selection (e.g., intelligent selection) of microservices (e.g., by the service management component 558), including connectionless microservices, and configuration of a forwarding table by the service management component 558 (e.g., by the SDN controller component of or associated with the service management component 558) in the uplink direction. The core network 502 also can comprise an interface 560 between the service management component 558 (e.g., the SDN controller component of or associated with the service management component 558) and the UPF component 542 in the downlink direction, wherein the interface 560 can be similarly configured as the interface 554 (N2 interface) to support the selection of microservices (e.g., by the service management component 558) and configuration of the forwarding table by the service management component 558.

The service management component 558 (e.g., the SDN controller component of or associated with the service management component 558) can utilize the interface 554 (N2 interface) and interface 560 to configure the RAN 540 and the UPF component 542 to recognize when the connectionless service is being utilized and/or operate in the connectionless mode with respect to data packets being communicated by a communication device (e.g., communication device 104) such that, when the RAN 540 receives a data packet being communicated when the connectionless service is being used, the RAN 540 can know that the data packet is to be forwarded in a connectionless manner (e.g., based on IP information associated with the data packet, with the data packet not having mobility header information and without a mobility communication tunnel being established) to the UPF component 542, and the UPF component 542 can know that the data packet is to be forwarded in a connectionless manner to the DN component 546. For instance, the service management component 558 (e.g., the SDN controller component of or associated with the service management component 558) can utilize the interface 560 to instruct the UPF component 542 how to forward data packets (e.g., forward data packets in a connectionless manner when the connectionless service is being utilized; forward data packets in a connection-oriented manner when the connection-oriented service is being utilized).

The disclosed subject matter, by employing the connectionless service, and enhancing the core network 502 (e.g., enhancing or configuring the interface 544 (N3 interface), interface 548 (N6 interface), interface 550 (N9 interface), and/or interface 560, . . . ), as more fully described herein, can enable virtually all control plane functions of the control plane 504 to be bypassed in connection with data communications associated with a wireless communication device (e.g., communication device 104).

It is to be appreciated and understood that, while the core network 502 has been depicted as having the service management component 558 (including the ONAP component and SDN controller component as part of the service management component 558) reside within the AMF component 514, and the interface 544 (N3 interface), interface 548 (N6 interface), and interface 550 (N9 interface) being enhanced and configured to support the connectionless service and/or other microservices, the disclosed subject matter is not so limited. In other embodiments, the service management component 558 (including the ONAP component and SDN controller component) can be located in a different part of the core network 502 and/or one or more other interfaces of the core network 502 can be enhanced or configured to support the connectionless service and/or other microservices, in addition to or as an alternative to the enhancing or configuring of the interface 544 (N3 interface), interface 548 (N6 interface), and interface 550 (N9 interface) to support the connectionless service and/or other microservices.

Figure 6:
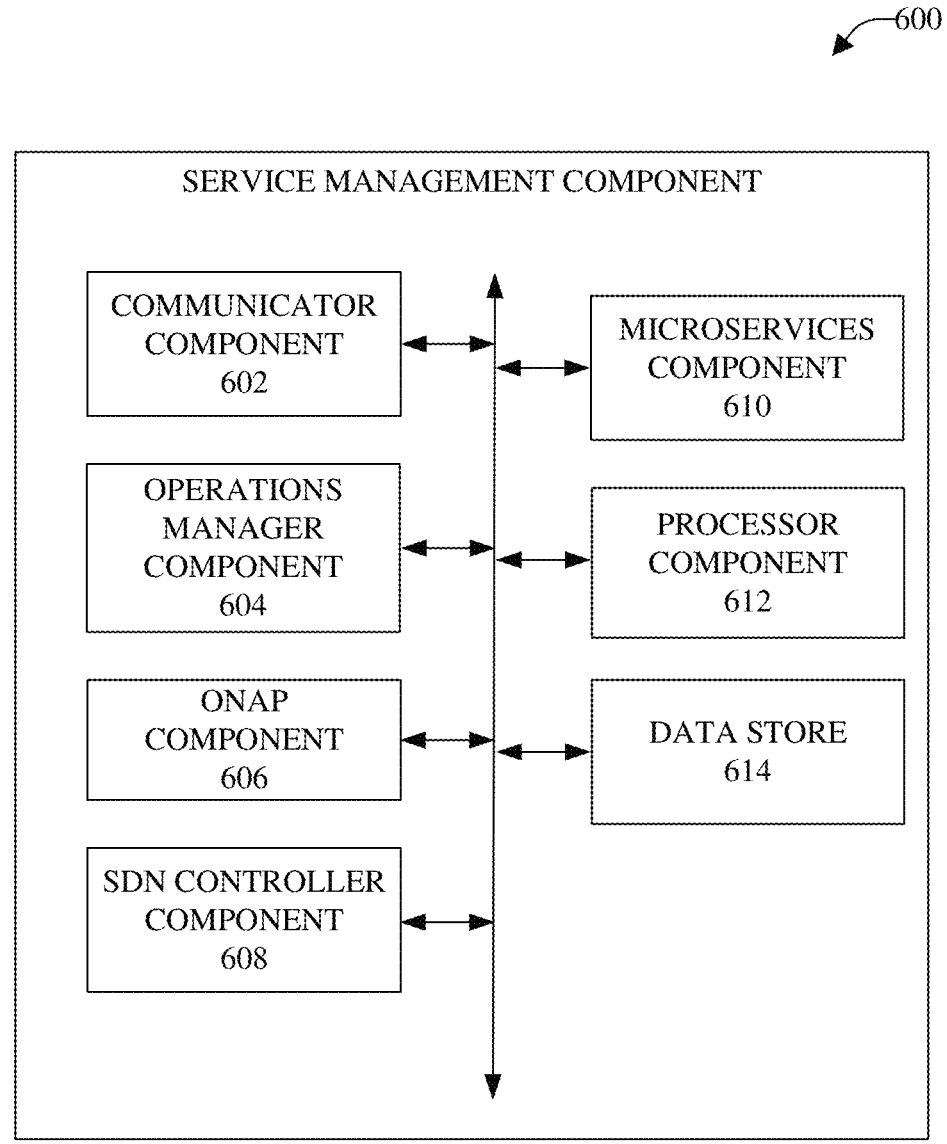
FIG. 6 presents a diagram of example, non-limiting service management component, in accordance with various aspects and embodiments of the disclosed subject matter.

FIG. 6 depicts a block diagram of an example, non-limiting service management component 600, in accordance with various aspects and embodiments of the disclosed subject matter. The service management component 600 can comprise a communicator component 602 that can communicate or facilitate communication of information (e.g., information or instructions relating to microservices) to other devices or components (e.g., devices or components of the core network), and can receive or facilitate receiving information from the other devices or components.

The service management component 600 also can include an operations manager component 604 that can control (e.g., manage) operations associated with the service management component 600. For example, the operations manager component 604 can facilitate generating instructions to have components of or associated with the service management component 600 perform operations, and can communicate respective instructions to respective components (e.g., communicator component 602, ONAP component 606, SDN controller component 608, microservices component 610, . . . ) of or associated with the service management component 600 to facilitate performance of operations by the respective components of or associated with the service management component 600 based at least in part on the instructions, in accordance with the defined service management criteria and the defined service management algorithm(s) (e.g., service management algorithms as disclosed, defined, recited, or indicated herein by the methods, systems, and techniques described herein). The operations manager component 604 also can facilitate controlling data flow between the respective components of the service management component 600 and controlling data flow between the service management component 600 and another component(s) or device(s) (e.g., devices or components of the core network) associated with (e.g., connected to) the service management component 600.

The service management component 600 can comprise an ONAP component 606 and an SDN controller component 608. The ONAP component 606 can receive information relating to communication device characteristics and/or information relating to service conditions associated with a subscription associated with and/or communication services being provided to a group comprising one or more communication devices. The ONAP component 606 can determine or facilitate determining what the characteristics of the group of communication devices are (e.g., whether the device is stationary or mobile; type of communication device; and/or applications or functionality of the communication device; . . . ), and what the service conditions associated with the group of communication devices are (e.g., data is to be communicated by or to the group of communication devices at periodic times or dynamically; authentication is desired; charging services are desired; and/or UPF services are desired; . . . ). The ONAP component 606 can instruct or notify the SDN controller component 608 of the characteristics and service conditions associated with the group of communication devices to facilitate determining which microservices to select and instantiate, and instantiating the desired (e.g., selected) microservices.

The SDN controller component 608 can receive information (e.g., information relating to communication device characteristics; information relating to service conditions associated with the subscription and/or the communication services being provided; and/or information indicating which microservices are to be instantiated with respect to the group of communication devices, . . . ) from the ONAP component 606. The SDN controller component 608 can analyze such information, and based at least in part on the results of such analysis, the SDN controller component 608 can determine what microservices are to be selected and instantiated, can create (e.g., dynamically create) an application comprising the desired microservices for the group of communication devices, can instantiate or facilitate instantiating those microservices, and/or can instruct other components (e.g., RAN, UPF component, . . . ) of the core network what microservices (e.g., connectionless service or connection-oriented service; UPF services; authentication service; and/or other service(s)) are being instantiated and utilized in connection with data communications for the group of communication devices.

The service management component 600 also can comprise a microservices component 610 that can comprise information (e.g., code, parameter data, metadata, and/or informational data, . . . ) relating to microservices that can be employed by the core network associated with the service management component 600. The microservices can comprise, for example, a connectionless service, a connection-oriented service, a charging service, an authentication service, UPF services, a slice service, cryptography services, coding services, and/or other services. The information relating to the microservices can facilitate the instantiating and implementing of the microservices by the service management component 600 and/or associated components. In accordance with various embodiments, the microservices component 610 can be a service repository component that can be part of the service management component 600, or can be implemented as a separate component that can be associated with the service management component 600, or can be part of the data store 614.

The service management component 600 also can comprise a processor component 612 can work in conjunction with the other components (e.g., communicator component 602, operations manager component 604, ONAP component 606, SDN controller component 608, microservices component 610, and data store 614) to facilitate performing the various functions of the service management component 600. The processor component 612 can employ one or more processors, microprocessors, or controllers that can process data, such as information relating to services (e.g., microservices), communication devices (e.g., characteristics and service conditions of or associated with communication devices), subscriptions relating to communication services and microservices, users, service management criteria, traffic flows, signaling, policies, algorithms (e.g., service management algorithm(s), mapping algorithm(s), . . . ), protocols, interfaces, tools, and/or other information, to facilitate operation of the service management component 600, as more fully disclosed herein, and control data flow between the service management component 600 and other components (e.g., communication device, other network devices of the communication network (e.g., core network), applications, . . . ) associated with the service management component 600.

The data store 614 can store data structures (e.g., user data, metadata), code structure(s) (e.g., modules, objects, hashes, classes, procedures) or instructions, information relating to services (e.g., microservices), communication devices (e.g., characteristics and service conditions of or associated with communication devices), subscriptions relating to communication services and microservices, users, service management criteria, traffic flows, signaling, policies, algorithms (e.g., service management algorithm(s), mapping algorithm(s), . . . ), protocols, interfaces, tools, and/or other information, to facilitate controlling operations associated with the service management component 600. In an aspect, the processor component 612 can be functionally coupled (e.g., through a memory bus) to the data store 614 in order to store and retrieve information desired to operate and/or confer functionality, at least in part, to the communicator component 602, operations manager component 604, ONAP component 606, SDN controller component 608, microservices component 610, and data store 614, etc., and/or substantially any other operational aspects of the service management component 600.

It should be appreciated that the data store 614 and/or service repository component described herein can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
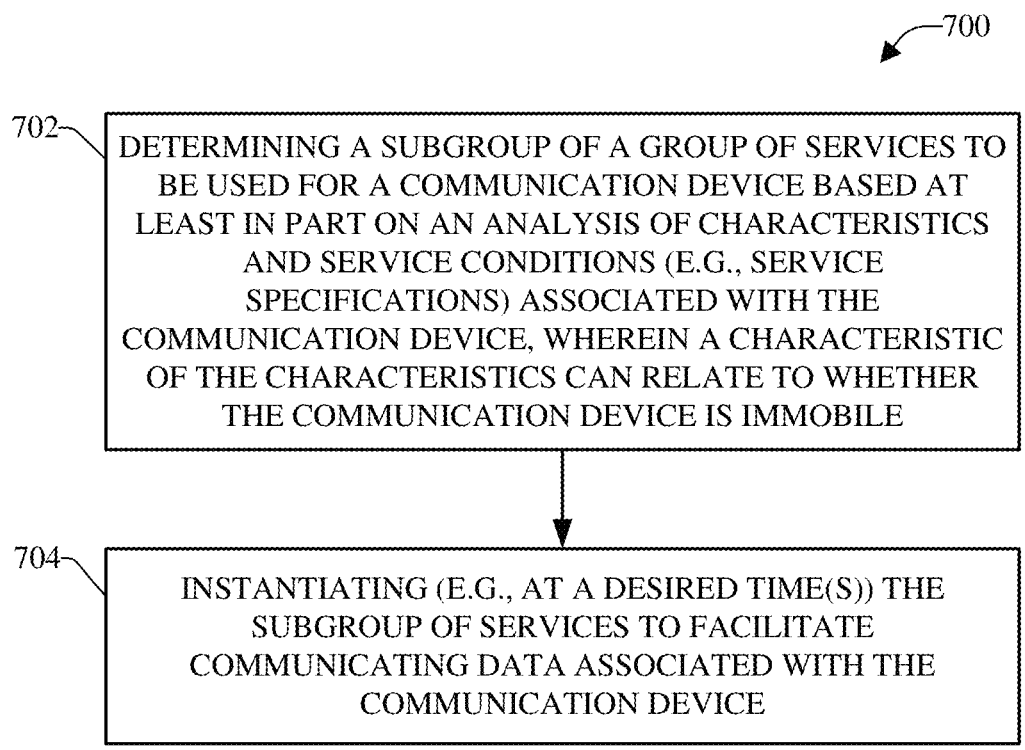
FIG. 7 illustrates a flow diagram of an example, non-limiting method that can instantiate and manage services (e.g., microservices) to facilitate desirable and efficient communication of information between communication devices associated with a communication network (e.g., a core network)
Figure 8:
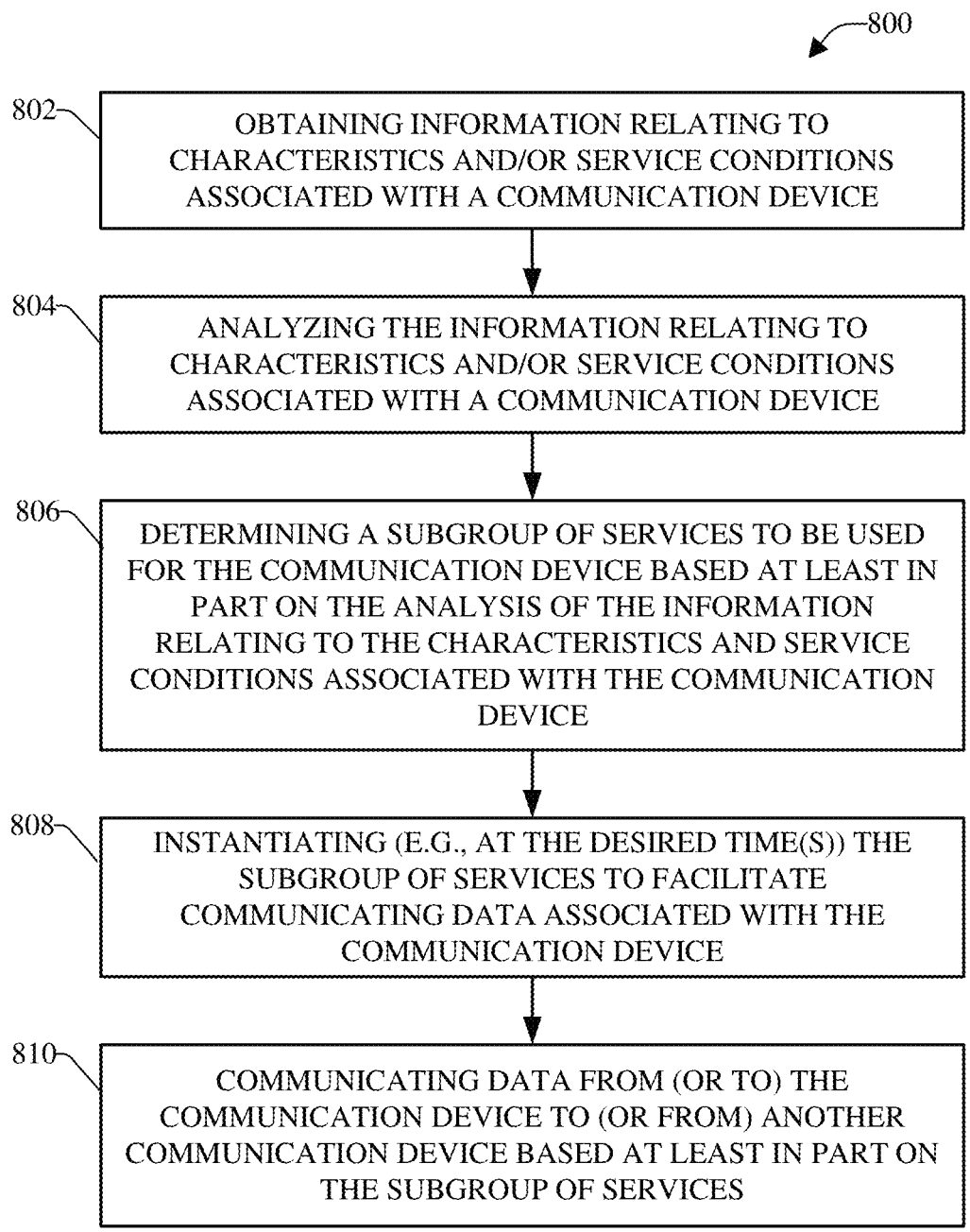
FIG. 8 depicts a flow diagram of an example, non-limiting method that can instantiate and manage services (e.g., microservices) to facilitate efficient communication of information between communication devices associated with a communication network (e.g., a core network), in accordance with various aspects and embodiments of the disclosed subject matter.

In view of the example systems and/or devices described herein, example methods that can be implemented in accordance with the disclosed subject matter can be further appreciated with reference to flowchart in FIGS. 7-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow diagram of an example, non-limiting method 700 that can instantiate and manage services (e.g., microservices) to facilitate desirable and efficient communication of information between communication devices associated with a communication network (e.g., a core network), in accordance with various aspects and embodiments of the disclosed subject matter. The method 700 can be implemented by a service management component, processor component, data store, and/or another component(s). Alternatively, or additionally, a machine-readable storage medium can comprise executable instructions that, when executed by a processor, facilitate performance of operations for the method 700.

At 702, a subgroup (e.g., subset) of a group (e.g., set) of services to be used for a communication device can be determined based at least in part on an analysis of characteristics and service conditions (e.g., service specifications) associated with the communication device, wherein a characteristic of the characteristics can relate to whether the communication device is immobile. The service management component can receive, obtain, or detect information relating to characteristics and service conditions associated with the communication device(s) (e.g., wireless communication device) from the communication device(s) by the service management component and/or from another device associated with an entity (e.g., service provider, utility company, or other user or entity). The service management component can analyze the information relating to the characteristics and service conditions associated with the communication device(s), as more fully described herein. The service management component can determine a subgroup of services (e.g., microservices) to be used for the communication device(s) based at least in part on the results of the analysis of the characteristics (e.g., whether the communication device is immobile) and service conditions associated with the communication device(s). For instance, in response to determining that the communication device is immobile, the service management component can determine that a connectionless service is to be included in the subgroup of services and utilized to facilitate communication of data (e.g., voice or other data). As another example, if, based at least in part on the analysis, the service management component determines that another microservice(s) (e.g., authentication service, charging service, and/or UPF services, . . . ) is to be included in the subgroup of services, the service management component can determine that the other microservice(s) is included in the subgroup of services to facilitate providing the desired (e.g., useful, appropriate, or suitable) microservices in connection with the communication of data from (or to) the communication device(s) to (or from) another device (e.g., another communication device).

At 704, the subgroup of services can be instantiated (e.g., at a desired time(s)) to facilitate communicating data associated with the communication device. At a desired time(s) (e.g., periodically, dynamically, or upon request), the service management component can instantiate or facilitate instantiating the subgroup of services to facilitate communicating data associated with the communication device(s) (e.g., to facilitate communicating data from the communication device(s) to another communication device or vice versa).

FIG. 8 depicts a flow diagram of another example, non-limiting method 800 that can instantiate and manage services (e.g., microservices) to facilitate efficient communication of information between communication devices associated with a communication network (e.g., a core network), in accordance with various aspects and embodiments of the disclosed subject matter. The method 800 can be implemented by a service management component, processor component, data store, and/or another component(s). Alternatively, or additionally, a machine-readable storage medium can comprise executable instructions that, when executed by a processor, facilitate performance of operations for the method 800.

At 802, information relating to characteristics and/or service conditions associated with a communication device can be obtained. The service management component can obtain, detect, or otherwise receive the information relating to characteristics and/or service conditions associated with the communication device from the communication device or another device (e.g., a device associated with an entity).

At 804, the information relating to characteristics and/or service conditions associated with a communication device can be analyzed. The service management component can analyze the information relating to the characteristics (e.g., whether communication device is stationary or mobile; type of communication device, . . . ) and/or service conditions (e.g., data communications to be secured by authentication; data communications to be secured by encryption; financial charges that are to be tracked or imposed in connection with data communications; . . . ) to facilitate determining or identifying one or more services (e.g., microservices) that are to be selected for use in connection with data communications associated with the communication device.

At 806, a subgroup of services to be used for the communication device can be determined based at least in part on the analysis of the information relating to the characteristics and service conditions associated with the communication device. Based at least in part on the results of the analysis of such information, the service management component can determine the subgroup of services to be used for the communication device in connection with data communications associated with the communication device. For instance, the service management component can determine one or more services that can satisfy service conditions associated with the communication device and/or the data communications associated with the communication device. The service management component also can determine whether a connectionless service or a connection-oriented service (e.g., a connection-oriented service utilizing mobility management functions) is to be utilized for data communications associated with the communication device based at least in part on a characteristic of the communication device relating to whether the communication device is stationary or mobile. If the service management component determines that the communication device is stationary, the service management component can determine that the connectionless service is to be employed (and included in the subgroup of services) in connection with data communications associated with the communication device. If, instead, the service management component determines that the communication device is mobile or moving, the service management component can determine that the connection-oriented service is to be employed (and included in the subgroup of services) in connection with data communications associated with the communication device.

At 808, the subgroup of services can be instantiated (e.g., at a desired time(s)) to facilitate communicating data associated with the communication device. At the desired time(s) (e.g., periodically, dynamically, or upon request), the service management component can instantiate or facilitate instantiating the subgroup of services to facilitate communicating data associated with the communication device (e.g., to facilitate communicating data from the communication device to another communication device or vice versa).

At 810, data can be communicated from (or to) the communication device to (or from) another communication device based at least in part on the subgroup of services. At one or more desired times (e.g., dynamically determined times, or periodic times), data can be communicated from (or to) the communication device to (or from) another communication device based at least in part on the subgroup of services, wherein at or in proximity to (e.g., just prior to) each of the one or more desired times, the service management component can instantiate or facilitate instantiating the subgroup of services for use in connection with such data communications associated with the communication device.

Described herein are systems, methods, articles of manufacture, and other embodiments or implementations that can facilitate determining services (e.g., microservices) to use in connection with a group of communication devices (e.g., group comprising one or more communication devices) associated with a communication network (e.g., a core network), managing services associated with the communication network, instantiating services for the group of communication device associated with the communication network, and/or performing other operations (e.g., operations of or associated with the service management component) in connection with providing, implementing, or instantiating such services. The determining of services, managing of services, and/or instantiating of services, associated with a communication network, and/or other features of the disclosed subject matter, can be implemented in connection with any type of device with a connection to the communication network (e.g., a mobile device, a computer, a handheld device, etc.) any Internet of things (IoT) device (e.g., toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
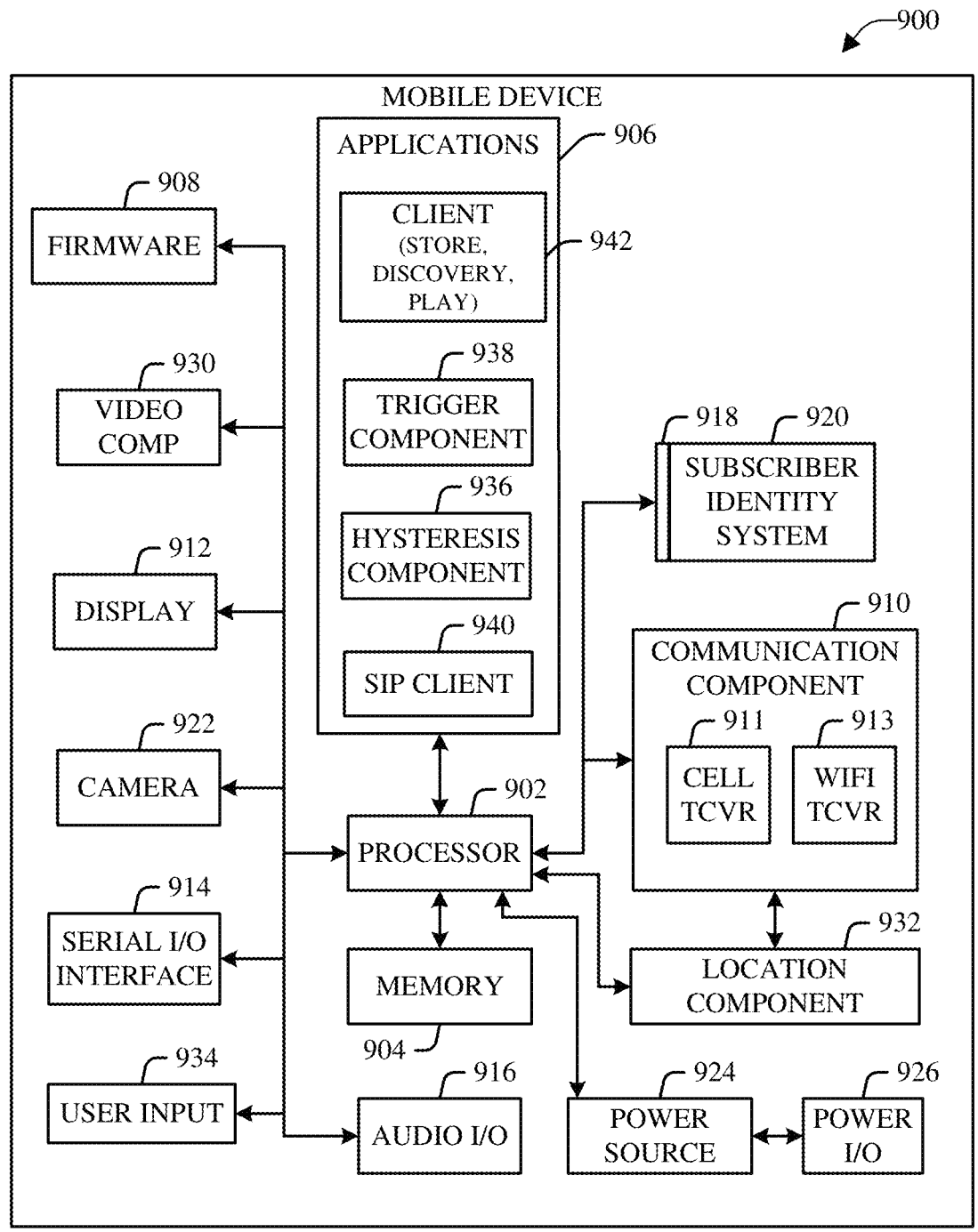
FIG. 9 depicts an example block diagram of an example mobile device operable to engage in a system architecture that facilitates wireless communications according to one or more embodiments described herein.

Referring now to FIG. 9, depicted is an example block diagram of an example mobile device 900 (e.g., mobile communication device) operable to engage in a system architecture that facilitates wireless communications according to one or more embodiments described herein. Although a mobile device is illustrated herein, it will be understood that other devices can be a mobile device, and that the mobile device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile device 900 can include a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the mobile device 900. A communication component 910 interfaces to the processor 902 to facilitate wired/wireless communication with external systems, e.g., cellular networks, VoIP networks, and so on. Here, the communication component 910 can also include a suitable cellular transceiver 911 (e.g., a GSM transceiver) and/or an unlicensed transceiver 913 (e.g., Wi-Fi, WiMax) for corresponding signal communications. The mobile device 900 can be a device such as a cellular telephone, a PDA with mobile communications capabilities, and messaging-centric devices. The communication component 910 also facilitates communications reception from terrestrial radio networks (e.g., broadcast), digital satellite radio networks, and Internet-based radio services networks.

The mobile device 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the mobile device 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The mobile device 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the mobile device 900, and updated by downloading data and software.

The mobile device 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the mobile device 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The mobile device 900 also includes a power source 924 in the form of batteries and/or an AC power subsystem, which power source 924 can interface to an external power system or charging equipment (not shown) by a power 110 component 926.

The mobile device 900 can also include a video component 930 for processing video content received and, for recording and transmitting video content. For example, the video component 930 can facilitate the generation, editing and sharing of video quotes. A location tracking component 932 facilitates geographically locating the mobile device 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the mobile device 900 to support SIP protocols and register the subscriber with the SIP registrar server. The applications 906 can also include a client 942 that provides at least the capability of discovery, play and store of multimedia content, for example, music.

The mobile device 900, as indicated above related to the communication component 910, includes an indoor network radio transceiver 913 (e.g., Wi-Fi transceiver). This function supports the indoor radio link, such as IEEE 802.11, for the dual-mode GSM device (e.g., mobile device 900). The mobile device 900 can accommodate at least satellite radio services through a device (e.g., handset device) that can combine wireless voice and digital radio chipsets into a single device (e.g., single handheld device).

Figure 10:
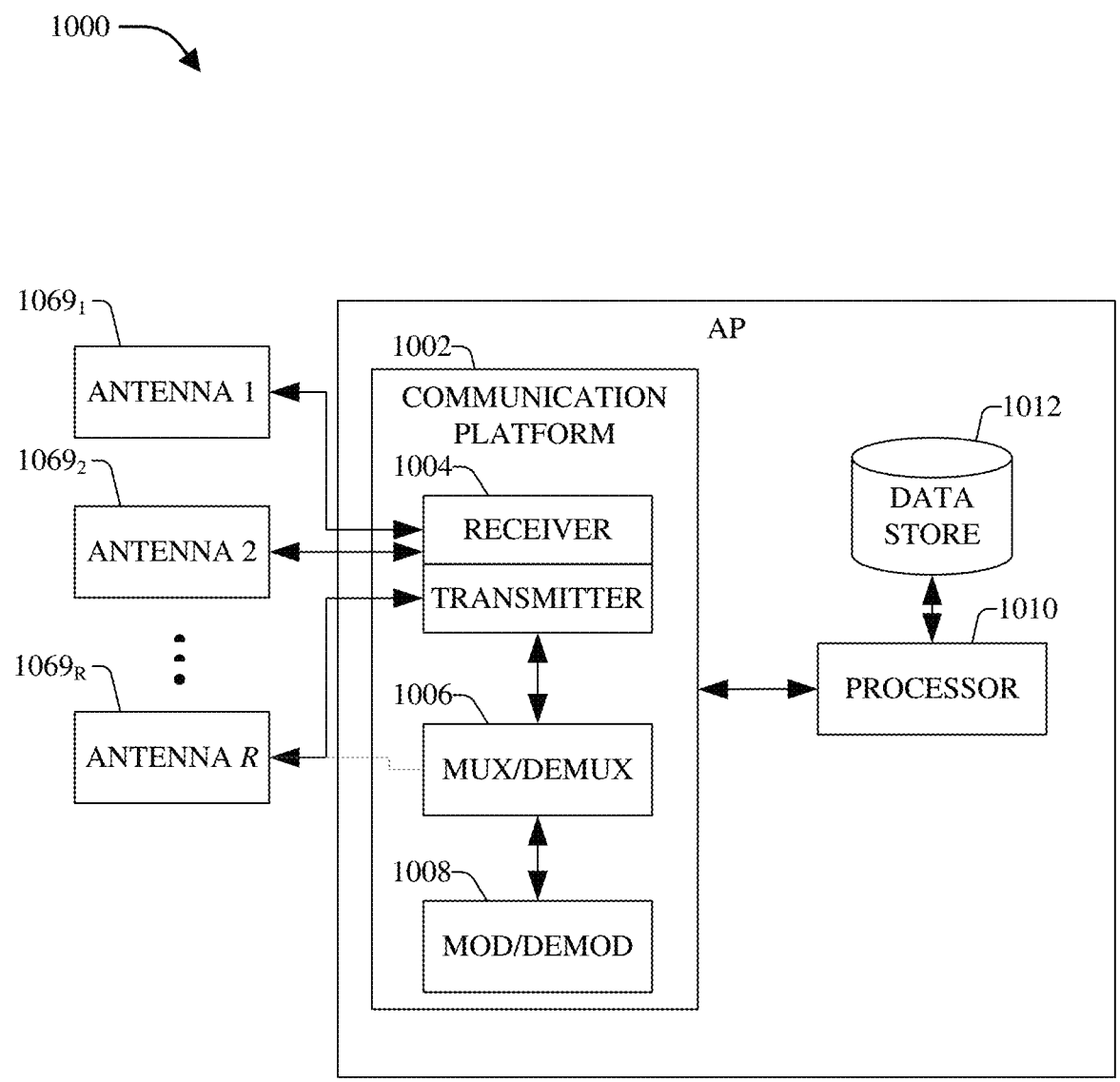
FIG. 10 illustrates a block diagram of an example access point, in accordance with various aspects and embodiments of the disclosed subject matter.

FIG. 10 illustrates a block diagram of an example AP 1000 (e.g., macro base station, femto AP, pico AP, Wi-Fi AP, Wi-Fi-direct AP, . . . ), in accordance with various aspects and embodiments of the disclosed subject matter. The AP 1000 can receive and transmit signal(s) from and to wireless devices like access points (e.g., base stations, femtocells, picocells, . . . ), access terminals (e.g., UEs), wireless ports and routers, and the like, through a set of antennas $1069_1$-$1069_R$. In an aspect, the antennas $1069_1$-$1069_R$ are a part of a communication platform 1002, which comprises electronic components and associated circuitry that can provide for processing and manipulation of received signal(s) and signal(s) to be transmitted. In an aspect, the communication platform 1002 can include a receiver/transmitter 1004 that can convert signal from analog to digital upon reception, and from digital to analog upon transmission. In addition, receiver/transmitter 1004 can divide a single data stream into multiple, parallel data streams, or perform the reciprocal operation.

In an aspect, coupled to receiver/transmitter 1004 can be a multiplexer/demultiplexer (mux/demux) 1006 that can facilitate manipulation of signal in time and frequency space. The mux/demux 1006 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1006 can scramble and spread information (e.g., codes) according to substantially any code known in the art, e.g., Hadamard-Walsh codes, Baker codes, Kasami codes, polyphase codes, and so on. A modulator/demodulator (mod/demod) 1008 also can be part of the communication platform 1002, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1000 also can comprise a processor(s) 1010 that can be configured to confer and/or facilitate providing functionality, at least partially, to substantially any electronic component in or associated with the AP 1000. For instance, the processor(s) 1010 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 1010 also can facilitate other operations on data, for example, to facilitate implementing or instantiating services (e.g., microservices) for use in connection with communication devices, communicating or forwarding data associated with (e.g., transmitted from or to be received by) communication devices using a connectionless service or connection-oriented service (as applicable), processing data based at least in part on an instantiated service(s), and/or interacting with the service management components or other components of the core network, etc.

In another aspect, the AP 1000 can include a data store 1012 that can store data structures; code instructions; rate coding information; information relating to measurement of radio link quality or reception of information related thereto; information relating to services (e.g., microservices), communication devices (e.g., characteristics and service conditions of or associated with communication devices), subscriptions relating to communication services and microservices, users, service management criteria, traffic flows, signaling, policies, algorithms (e.g., service management algorithm(s), mapping algorithm(s), . . . ), protocols, interfaces, tools, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1010 can be coupled to the data store 1012 in order to store and retrieve information (e.g., information, such as algorithms, relating to multiplexing/demultiplexing or modulation/demodulation; information relating to radio link levels; information relating to establishing communication connections associated with a communication device(s) served by the AP 1000; information relating to implementing or instantiating services (e.g., microservices) for use in connection with communication devices, communicating or forwarding data associated with (e.g., transmitted from or to be received by) communication devices using a connectionless service or connection-oriented service (as applicable), processing data based at least in part on an instantiated service(s), and/or interacting with the service management components or other components of the core network, etc.; . . . ) desired to operate and/or confer functionality to the communication platform 1002 and/or other operational components of AP 1000.

Figure 11:
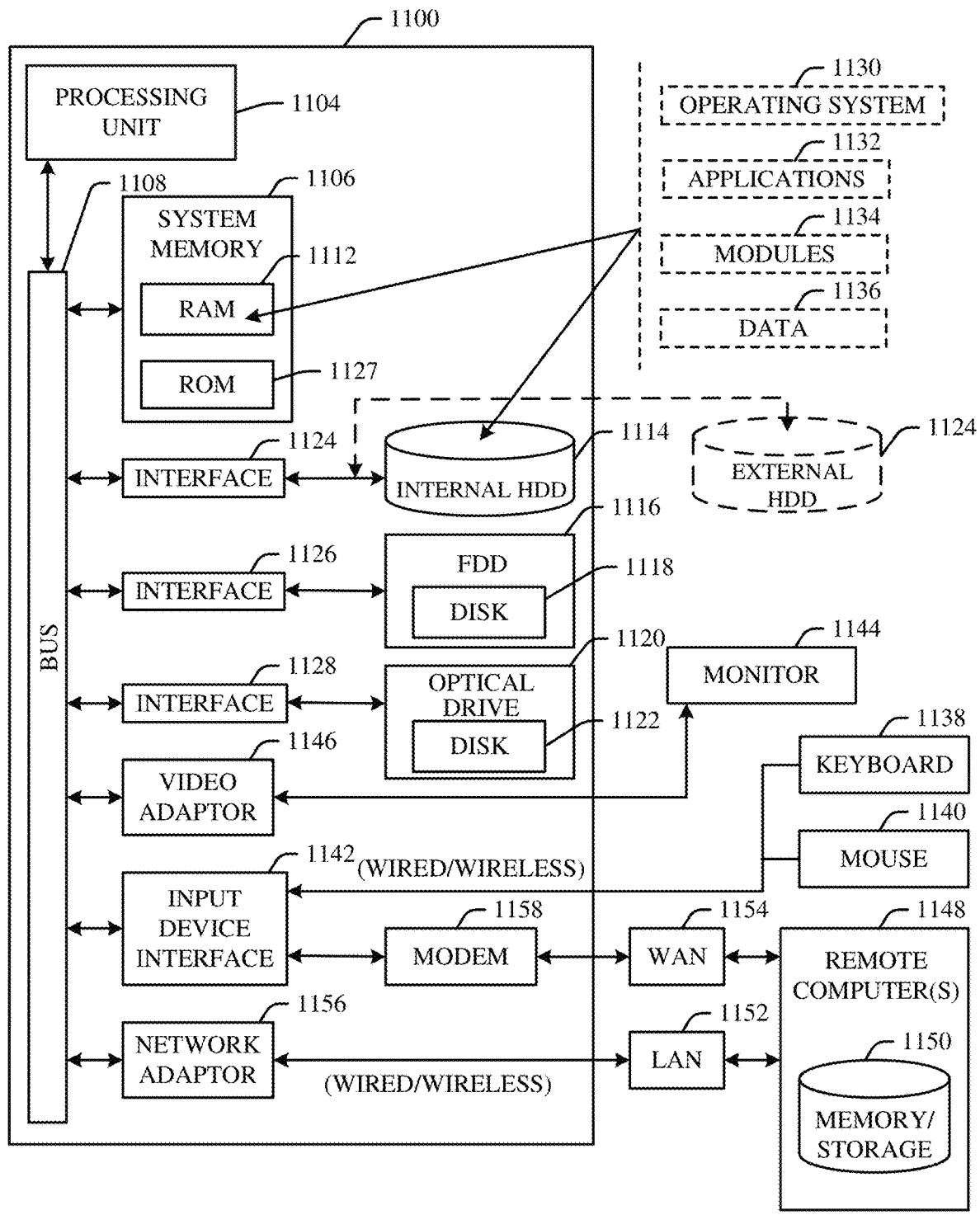
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the disclosed subject matter can be implemented to facilitate determining services (e.g., microservices) to use in connection with a group of communication devices (e.g., group comprising one or more communication devices) associated with a communication network (e.g., a core network), managing services associated with the communication network, instantiating services for the group of communication device associated with the communication network, and/or performing other operations (e.g., operations of or associated with the service management component) in connection with providing, implementing, or instantiating such services. While the description above is in the general context of computer-executable instructions that can run on one or more computers, those skilled in the art will recognize that the disclosed subject also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that can be linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   determining a subgroup of services to be utilized for a first device based on an analysis of a characteristic of the first device and a service specification associated with the first device, wherein a group of services comprises the subgroup of services, and wherein the characteristic of the first device relates to whether the first device is stationary; and
   instantiating the subgroup of services to facilitate communication of data by the first device.

2. The system of claim 1, wherein the group of services comprises microservices that are reusable and derived from decomposing mobility network functions.

3. The system of claim 2, wherein a microservice of the microservices is selected from a group of microservices comprising a connectionless service, a connection-oriented service, a charging service, an authentication service, a data cryptography service, a user plane function service, and a slice service, wherein the connectionless service facilitates data communications without establishing a mobility communication tunnel associated with a core network device of a core network, and wherein the connection-oriented service facilitates the data communications by establishing the mobility communication tunnel associated with the core network device.

4. The system of claim 1, wherein service specifications, comprising the service specification, associated with the first device relate to at least one of a time period that the communication of the data is to occur, a data type of the data, an amount of the data to be communicated, whether the data is to be encrypted, whether the data is to be secured by an authentication protocol, whether a financial charge is associated with the communication of the data, or whether a service slice is to be generated to facilitate the communication of the data; and
   wherein characteristics, comprising the characteristic, of the first device relate to at least one of a device type of the first device, whether the first device is stationary, whether the first device is mobile, whether the first device is to utilize mobility management services, or a type of application to be utilized by the first device in connection with the communication of the data.

5. The system of claim 4, wherein the determining the subgroup of services to be utilized for the first device comprises determining at least a first service and a second service of the subgroup of services to be utilized for the first device based on the analysis, and wherein the analysis comprises the analysis of the characteristics of the first device and the service specifications associated with the first device.

6. The system of claim 1, wherein the operations further comprise:
   in response to determining that the first device is stationary, determining that the data is to be communicated via a connectionless service, wherein the subgroup of services comprises the connectionless service; and communicating, via the connectionless service, the data from the first device to a second device.

7. The system of claim 6, wherein the communicating, via the connectionless service, the data comprises communicating, via the connectionless service, the data from the first device to the second device, based on a data packet communication protocol, without establishing, with respect to the first device, a mobility communication tunnel associated with a core network device of the core network, in accordance with the connectionless service.

8. The system of claim 7, wherein the data packet communication protocol comprises an Internet protocol, and wherein the communicating, via the connectionless service, the data comprises communicating, via the connectionless service, the data from the first device to the second device, based on destination address information associated with the second device and source address information associated with the first device, in accordance with the Internet protocol.

9. The system of claim 6, wherein the communicating, via the connectionless service, the data comprises communicating, via the connectionless service, the data from the first device to the second device via a core network device of a core network, and wherein at least a portion of control plane functions of the core network are bypassed in connection with the communicating of the data.

10. The system of claim 1, wherein the characteristic is a first characteristic, and wherein the operations further comprise:
    in response to determining that the first characteristic indicates that the first device is mobile or nomadic, determining that the data is to be communicated via a connectionless service based on at least one of a second characteristic of the first device or the service specification indicating that the connectionless service is able to be used to communicate the data, wherein the subgroup of services comprises the connectionless service; and
    communicating, via the connectionless service, the data from the first device to a second device.

11. The system of claim 1, wherein the operations further comprise:
    registering the group of services with a core network device of a core network;
    storing information related to the group of services in a service repository device associated with the core network; and
    retrieving a portion of the information related to the subgroup of services from the service repository device to facilitate creating an application, employing the subgroup of services, based on the portion of the information.

12. A method, comprising:
    determining, by a system comprising a processor, a subgroup of services, of a group of services, to be used for a wireless device based on an analysis of a characteristic and a service condition associated with the wireless device, wherein the characteristic relates to whether the wireless device is immobile; and
    instantiating, by the system, the subgroup of services to facilitate communicating information associated with the wireless device.

13. The method of claim 12, wherein the group of services comprises microservices that are reusable and formed by decomposing mobility network functions associated with a core network, wherein a microservice of the microservices is selected from a group of microservices comprising a connectionless service, a mobility connection service, a charging service, an authentication service, a data cryptography service, a user plane function service, and a slice service, wherein the connectionless service facilitates information communications without generating a mobility communication tunnel associated with a core network device of the core network, and wherein the mobility connection service facilitates the information communications by generating the mobility communication tunnel associated with the core network device.

14. The method of claim 12, wherein service conditions, comprising the service condition, associated with the wireless device relate to at least one of a time period that the communicating of the information is to occur, an information type of the information, an amount of the information to be communicated, whether the information is to be encrypted, whether the information is to be secured by an authentication protocol, whether a financial charge is associated with the communicating of the information, or whether a service slice is to be instantiated to facilitate the communicating of the information; and
    wherein characteristics, comprising the characteristic, associated with the wireless device relate to at least one of a device type of the wireless device, whether the wireless device is immobile, whether the wireless device is mobile, whether the wireless device is to utilize mobility management services in connection with the communicating of the information, or a type of application to be utilized by the wireless device in connection with the communicating of the information.

15. The method of claim 14, wherein the determining the subgroup of services to be used for the wireless device comprises determining at least a first service and a second service of the subgroup of services that are to be used for the wireless device based on the analysis, and wherein the analysis comprises the analysis of the characteristics and the service conditions associated with the wireless device.

16. The method of claim 12, further comprising:
    in response to determining that the wireless device is immobile, determining, by the system, that the information is to be communicated using a connectionless service, wherein the subgroup of services comprises the connectionless service; and
    communicating, using the connectionless service, the information from the wireless device to a device.

17. The method of claim 16, wherein the communicating, using the connectionless service, the information comprises communicating, using the connectionless service, the information from the wireless device to the device, based on an information packet communication protocol, wherein, in accordance with the connectionless service, the information is communicated without generating, with respect to the wireless device, a mobility communication tunnel associated with a core network device of a core network and without utilizing a portion of control plane functions of the core network.

18. The method of claim 11, further comprising:
    registering, by the system, the group of services;
    storing, by the system, service information related to the group of services in a service repository device; and
    accessing, by the system, a portion of the service information related to the subgroup of services from the service repository device to facilitate creating an application, employing the subgroup of services, based on the portion of the service information.

19. A non-transitory machine-readable medium, comprising executable instructions that, when executed by a processor, facilitate performance of operations, comprising:
 determining a service of services that is to be used for a first device based on an analysis of an attribute and a service condition associated with the first device, wherein the attribute relates to whether a mobility communication tunnel associated with a core network device of the core network is to be used in connection with communication of data by the first device; and
 initiating creation of an instance of the service to facilitate the communication of the data by the first device.

20. The non-transitory machine-readable medium of claim 19, wherein the service comprises a connectionless service, and wherein the operations further comprise:
 in response to determining, based on the analysis, that the mobility communication tunnel is not to be used in connection with the communication of the data by the first device, determining that the data is to be communicated using the connectionless service; and
 communicating, using the connectionless service, the data from the first device to a second device, based on a data packet communication protocol, without establishing the mobility communication tunnel in connection with the communication of the data, in accordance with the connectionless service.

\* \* \* \* \*